United States Patent
Budarin et al.

(10) Patent No.: US 10,072,227 B2
(45) Date of Patent: Sep. 11, 2018

(54) MICROWAVE TORREFACTION OF BIOMASS

(75) Inventors: Vitaliy Lvovich Budarin, York (GB); Krzysztof Jakub Milkowski, York (GB); Peter Shuttleworth, Huddersfield (GB); Brigid Lanigan, York (GB); James Hanley Clark, York (GB); Duncan James Macquarrie, York (GB); Ashley Wilson, York (GB)

(73) Assignee: University of York, York (GB)

( * ) Notice: Subject to any disclaimer, the term of this patent is extended or adjusted under 35 U.S.C. 154(b) by 1080 days.

(21) Appl. No.: 13/002,424

(22) PCT Filed: Jul. 3, 2009

(86) PCT No.: PCT/GB2009/001672
§ 371 (c)(1),
(2), (4) Date: May 17, 2011

(87) PCT Pub. No.: WO2010/001137
PCT Pub. Date: Jan. 7, 2010

(65) Prior Publication Data
US 2011/0219679 A1    Sep. 15, 2011

(30) Foreign Application Priority Data

Jul. 4, 2008   (GB) ................................. 0812288.9
Jan. 26, 2009 (GB) ................................. 0901150.3

(51) Int. Cl.
*C10L 5/00*   (2006.01)
*C10L 5/44*   (2006.01)
(Continued)

(52) U.S. Cl.
CPC ............. *C10L 5/44* (2013.01); *C10B 19/00* (2013.01); *C10B 53/02* (2013.01); *C10C 5/00* (2013.01);
(Continued)

(58) Field of Classification Search
CPC ........... C10B 19/00; C10B 53/02; C10C 5/00; C10C 5/44; C10L 9/083;
(Continued)

(56) References Cited

U.S. PATENT DOCUMENTS 1,493,836 A    5/1924   Wurster
3,843,457 A *  10/1974  Grannen et al. ............... 201/2.5
(Continued)

FOREIGN PATENT DOCUMENTS

CA    2577684 A1    8/2007
DE    3237267 A1    4/1984
(Continued)

OTHER PUBLICATIONS

Author Not Known, The Exploitation of Pyrolysis Oil in the Refinery, The Carbon Trust, (2008).
(Continued)

*Primary Examiner* — Latosha Hines
(74) *Attorney, Agent, or Firm* — K&L Gates LLP

(57) ABSTRACT

There is described a processor for use in the microwave torrefaction of biomass material which comprises, a micronized biomass char material and a method of producing a biomass char material, and a method of producing L-glucosan.

6 Claims, 24 Drawing Sheets

Schematic outline of microwave processor

(51) Int. Cl.
  *C10B 19/00* (2006.01)
  *C10B 53/02* (2006.01)
  *C10C 5/00* (2006.01)
  *C10L 9/08* (2006.01)
(52) U.S. Cl.
  CPC ............... *C10L 9/083* (2013.01); *Y02E 50/10* (2013.01); *Y02E 50/14* (2013.01); *Y02E 50/15* (2013.01); *Y02E 50/30* (2013.01); *Y02P 20/145* (2015.11)
(58) Field of Classification Search
  CPC ...... F25B 2600/2513; F25B 2600/2519; F25B 41/062; Y02E 50/10; Y02E 50/14; Y02E 50/15; Y02E 50/30; Y02P 20/145
  USPC .......................................................... 44/605
  See application file for complete search history.

(56) References Cited

U.S. PATENT DOCUMENTS

| | | | |
|---|---|---|---|
| 4,631,380 | A | 12/1986 | Tran |
| 4,795,300 | A | 1/1989 | Tomaselli et al. |
| 5,084,141 | A | 1/1992 | Holland |
| 5,330,623 | A | 7/1994 | Holland |
| 7,101,464 | B1 | 9/2006 | Pringle |
| 2003/0221363 | A1 | 12/2003 | Reed |
| 2007/0220805 | A1* | 9/2007 | Leveson ................... C10J 3/00 44/605 |
| 2008/0063578 | A1 | 3/2008 | Molohon et al. |

FOREIGN PATENT DOCUMENTS

| | | | | |
|---|---|---|---|---|
| EP | 0073714 | A2 | 3/1983 | |
| EP | 0585632 | A1 | 3/1994 | |
| EP | 1978086 | A1 | 10/2008 | |
| FR | 2604942 | A1 * | 4/1988 | ........... B27K 5/0085 |
| FR | 2604942 | A1 | 4/1988 | |
| WO | WO 2006057563 | A1 * | 6/2006 | |
| WO | WO-2007/007068 | A1 | 1/2007 | |
| WO | WO2007/138534 | A1 * | 12/2007 | |
| WO | WO-2009/079127 | A2 | 6/2009 | |

OTHER PUBLICATIONS

Chen, M. et al., Catalytic effects of eight inorganic additives on pyrolysis of pine wood sawdust by microwave heating, Journal of Analytical and Applied Pyrolysis, 82:145-150 (2008).

Di Blasi, C. et al., Thermal and catalytic decomposition of wood impregnated with sulfur- and phosphorus-containing ammonium salts, Polymer Degradation and Stability, 93:335-346 (2008).

Domínguez, A. et al., Conventional and microwave induced pyrolysis of coffee hulls for the production of a hydrogen rich fuel gas, J. Anal. Appl. Pyrolysis, 79:128-135 (2007).

Domínguez, A. et al., Production of bio-fuels by high temperature pyrolysis of sewage sludge using conventional and microwave heating, Bioresource Technology, 97:1185-1193 (2006).

Evans, R.J. and Milne, T.A., Molecular Characterization of the Pyrolysis of Biomass. 1. Fundamentals, Energy & Fuels, 1(2):123-137 (1987).

Fahmi, R. et al., Prediction of Klason lignin and lignin thermal degradation products by Py-GC/MS in a collection of *Lolium* and *Festuca* grasses, J. Anal. Appl. Pyrolysis, 80:16-23 (2007).

Heyerdahl, P. and Gilpin, G., Distributed Biomass Conversion, 8-38 (2006).

International Search Report for PCT/GB2009/001672, 8 pages (dated May 7, 2010).

Jenkins, B.M. et al., Combustion properties of biomass, Furel Processing Technology, 54:17-46 (1998).

Krieger-Brockett, B., Microwave pyrolysis of biomass, Research on Chemical Intermediates, 20:39-49 (1994).

Menéndez, J.A. et al., Evidence of Self-Gasification during the Microwave-Induced Pyrolysis of Coffee Hulls, Energy & Fuels, 21:373-378 (2007).

Menéndez, J.A. et al., Microwave-induced drying, pyrolysis and gasification (MWDPG) of sewage sludge: Vitrification of the solid residue, J. Anal. Appl. Pyrolysis, 74:406-412 (2005).

Miura, M. et al., Microwave pyrolysis of cellulosic materials for the productions of anhydrosugars, J Wood Sci, 47:502-506 (2001).

Miura, M. et al., Rapid pyrolysis of wood block by microwave heating, J. Anal. Appl. Pyrolysis, 71:187-199 (2004).

Nowakowski, D.J. and Jones, J.J., Uncatalysed and potassium-catalysed pyrolysis of the cell-wall constituents of biomass and their model compounds, J. Anal. Appl. Pyrol., 83:12-25 (2008).

Nowakowski, D.J. et al., Phosphorous catalysis in the pyrolysis behavious of biomass, J. Anal. Appl. Pyrolysis, 83:197-204 (2008).

Sarotti, et al., An efficient microwave-assisted green transformation of cellulose into levoglucosenone. Advantages of the use of an experiment design approac, Green Chemistry, 9:1137-1140 (2007).

Written Opinion for PCT/GB2009/001672, 9 pages (dated May 7, 2010).

Yu, F. et al., Microwave Pyrolysis of Biomass, American Society of Agricultural and Biological Engineers, 1-12 (2006).

Yu, F. et al., Physical and Chemical Properties of Bio-Oils From Microwave Pyrolysis of Corn Stover, Applied Biochemistry and Biotechnology, 136-140:957-970 (2007).

* cited by examiner

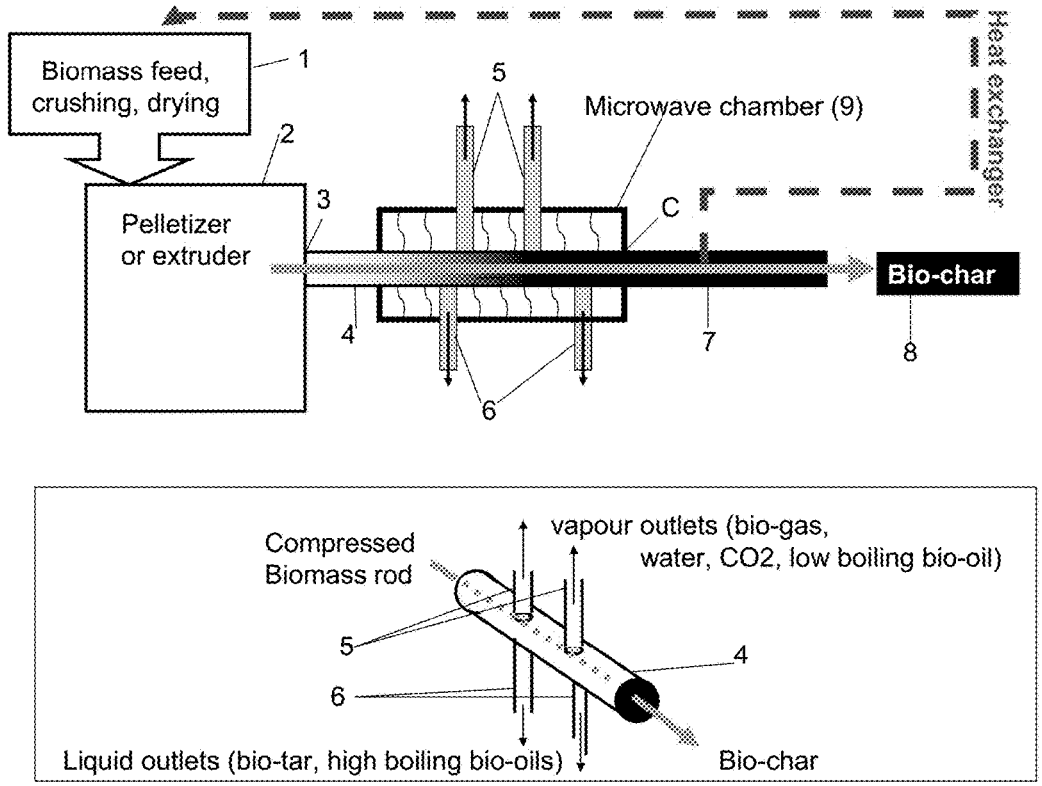
FIG. 1: Schematic outline of microwave processor
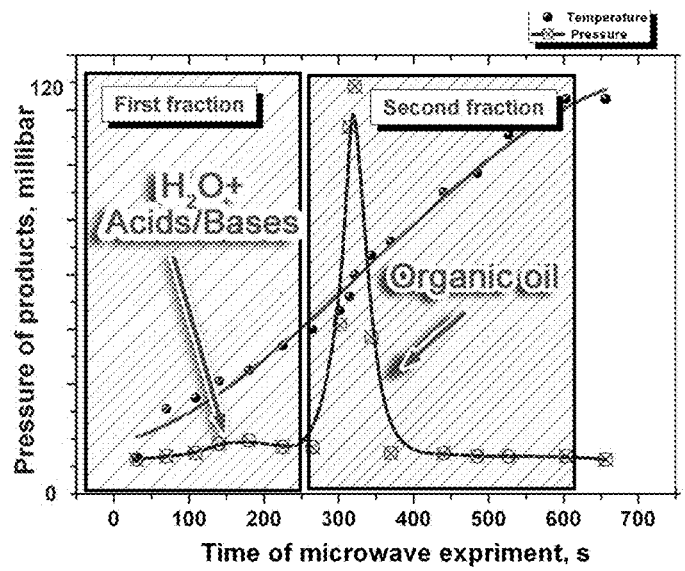
FIG. 2: Separation of aqueous and organic fraction based on microwave time.

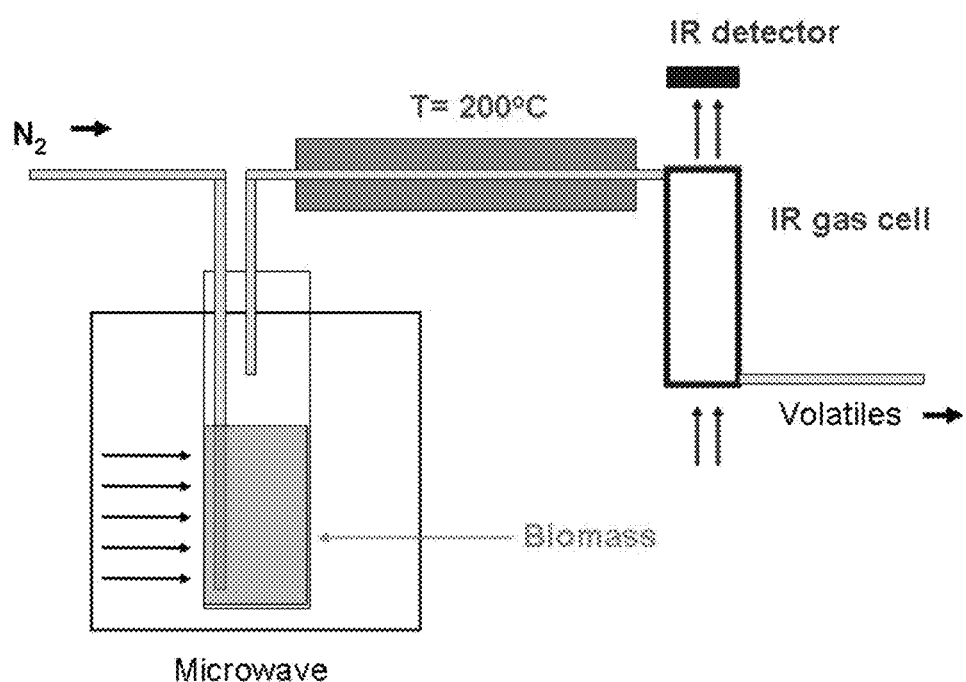
FIG. 3: Apparatus set-up for simultaneous microwave-IR experiment.

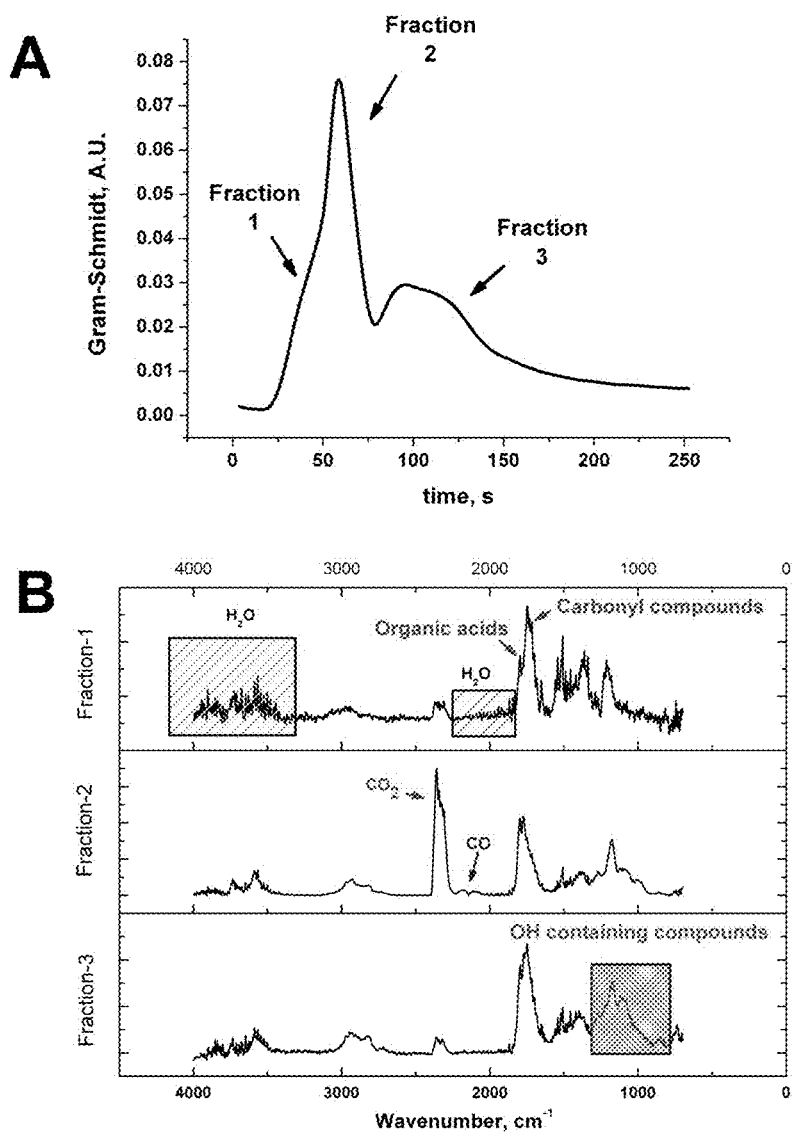
FIG. 4: A) Gram-Schmidt trace for isotherm pyrolysis of pelletised biomass. B) IR spectrum of the fractions

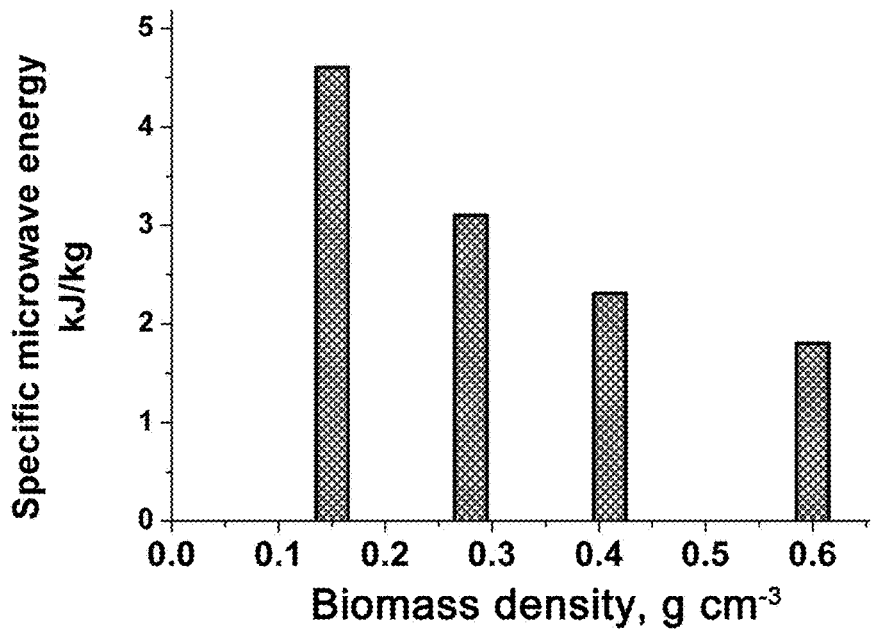
FIG. 5: Relationship of the specific microwave energy (amount of microwave energy per unit mass which the biomass absorbs) with the degree of densification of wheat
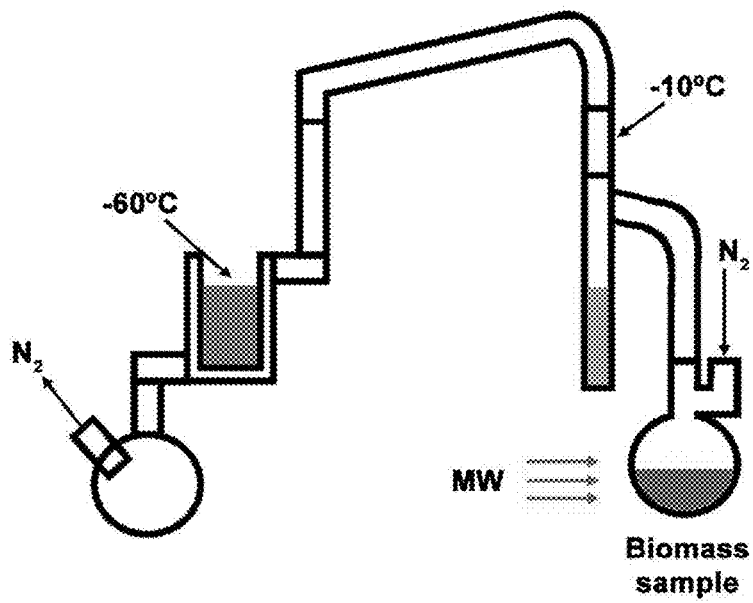
FIG. 6: Schematic of the apparatus set-up for the microwave extraction of volatiles from Rape Meal.

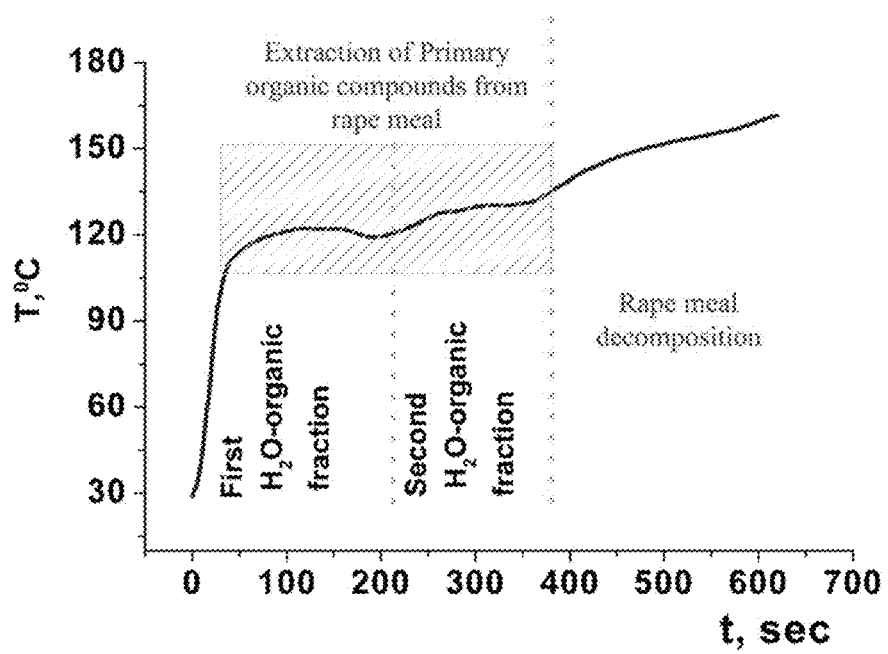
FIG. 7: Microwave profile for the extraction of volatiles from Rape Meal. The profile is split in to different regions to emphasise the different stages of extraction.

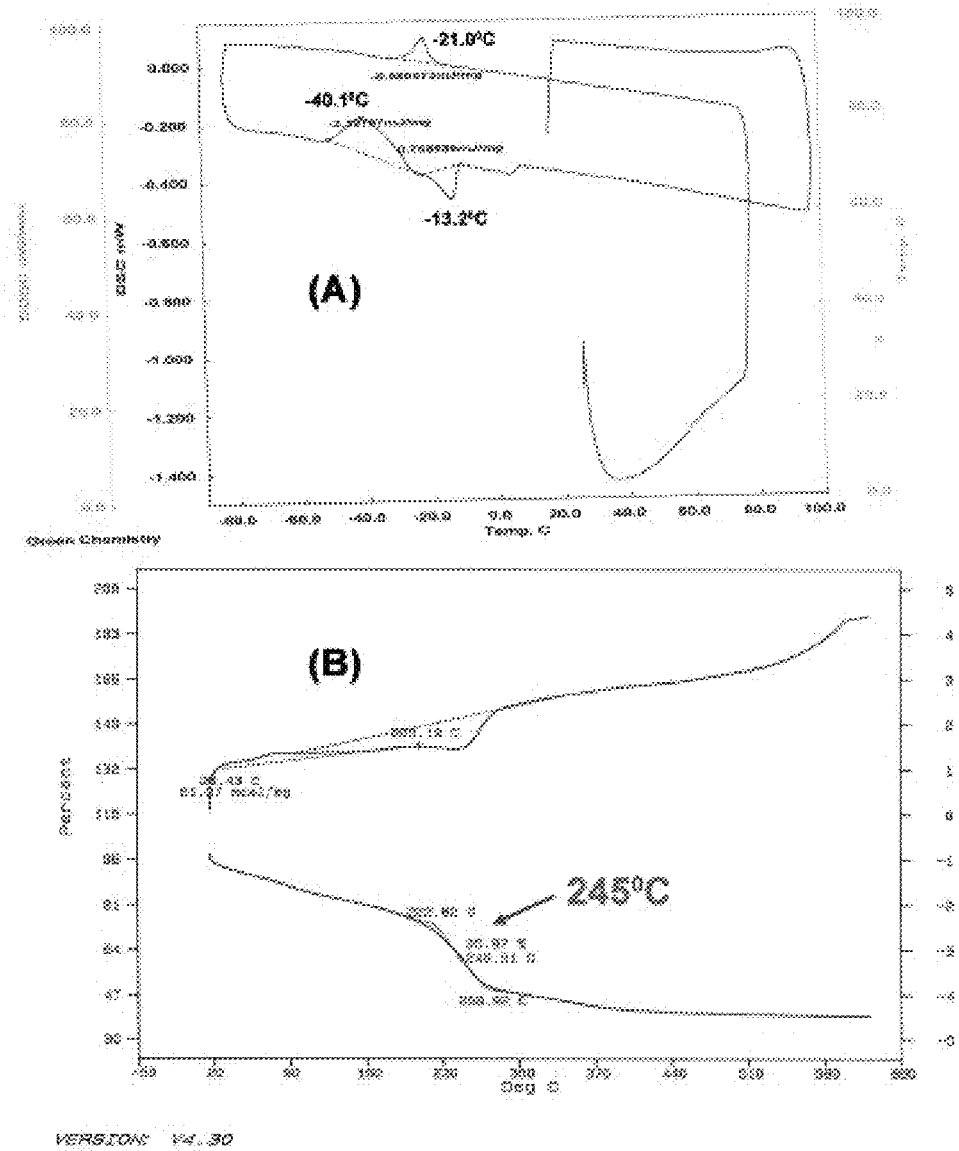
FIG. 8: A, Differential Scanning Calorimetry analysis of the rape meal oil extract. B, Thermogravimetric analysis of the rape meal extract.

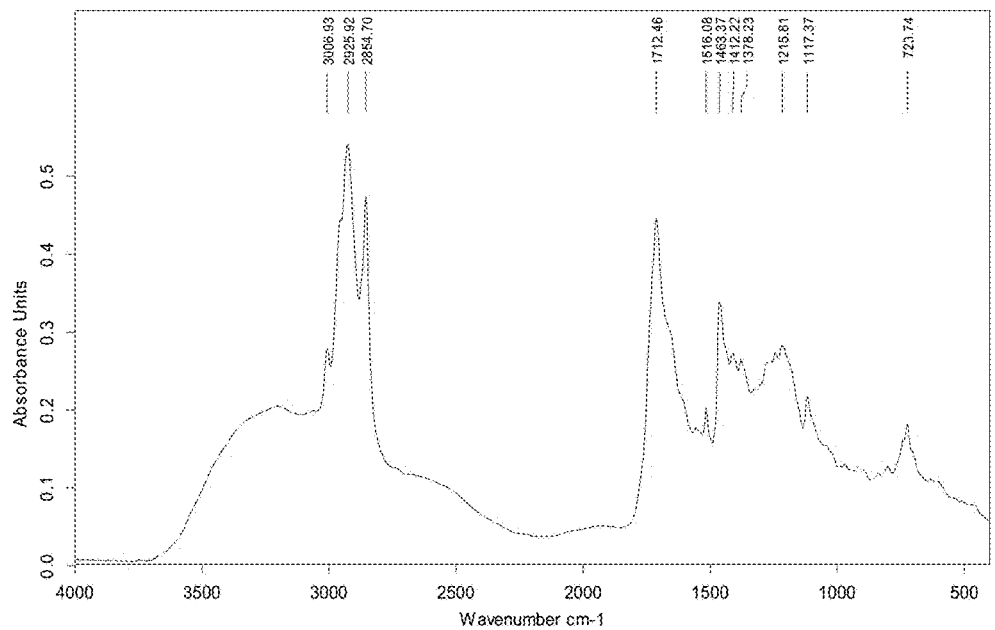
FIG. 9: FTIR spectrum of the liquid organic compounds extracted from Rape meal.
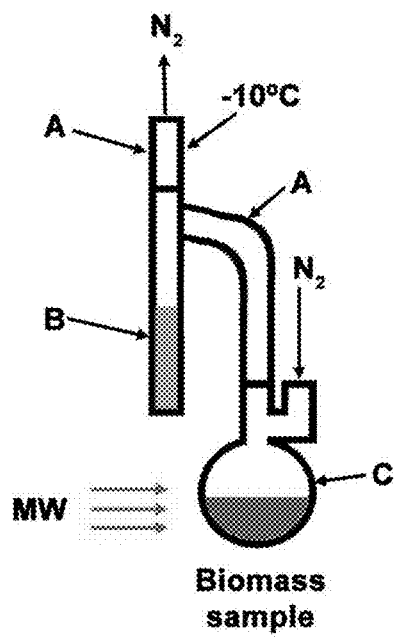
FIG. 10: Scheme of the apparatus set-up for microwave co-extraction of volatile organic compounds with water from Pine wood.

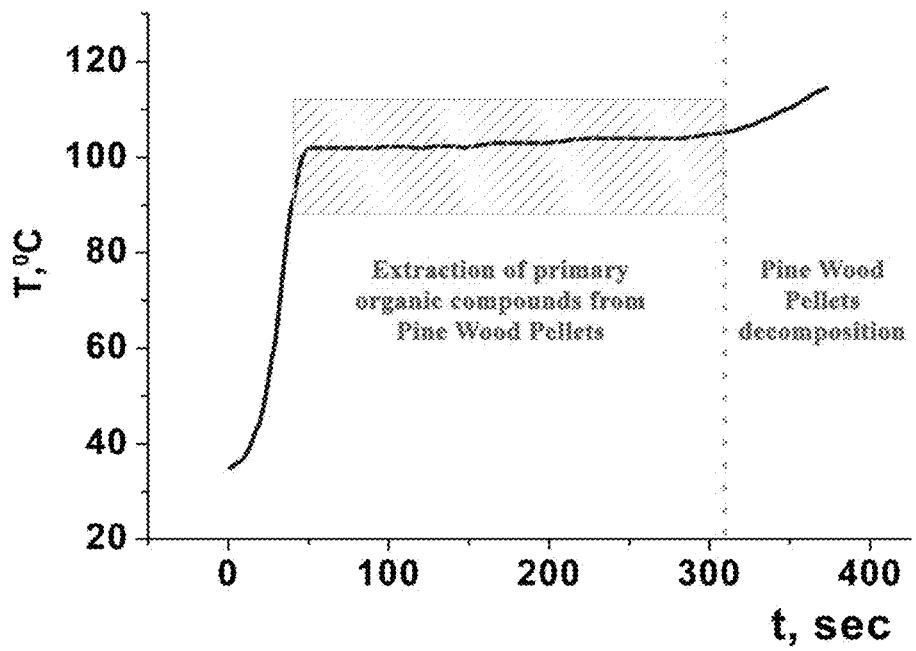
FIG. 11: Microwave profile for the extraction of volatiles from Pine Wood Pellets. The profile is split in to different regions to emphasise the different stages of extraction.
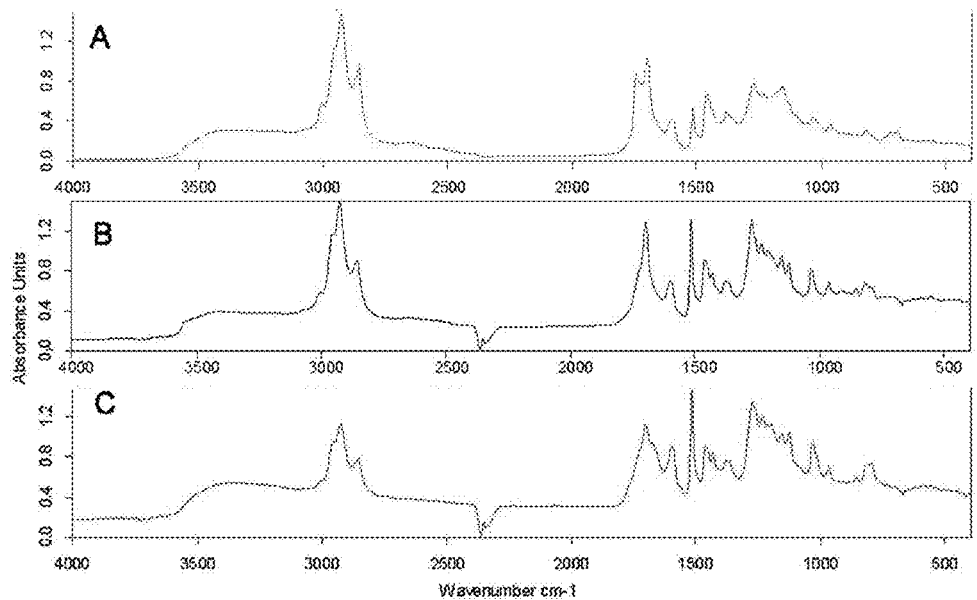
FIG. 12: FTIR analysis on the volatile extracts from pine wood obtained at the different irradiation power (EAmw>EBmw>ECmw).

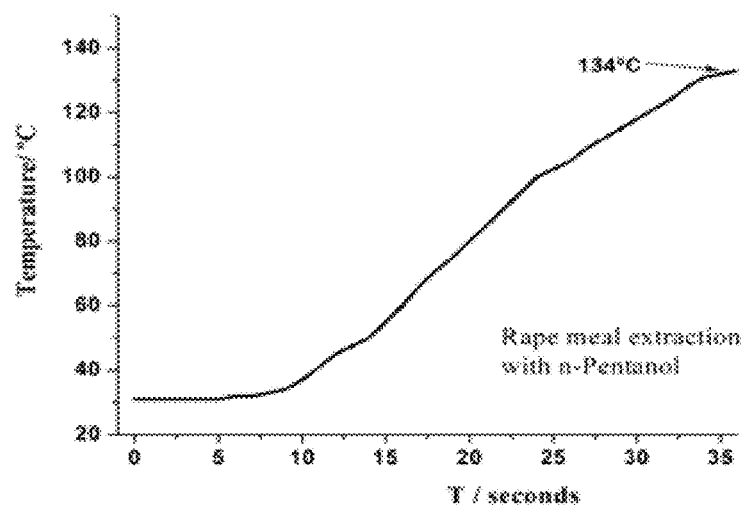
FIG. 13: Microwave profile of Rape meal extracted with n-Pentanol.
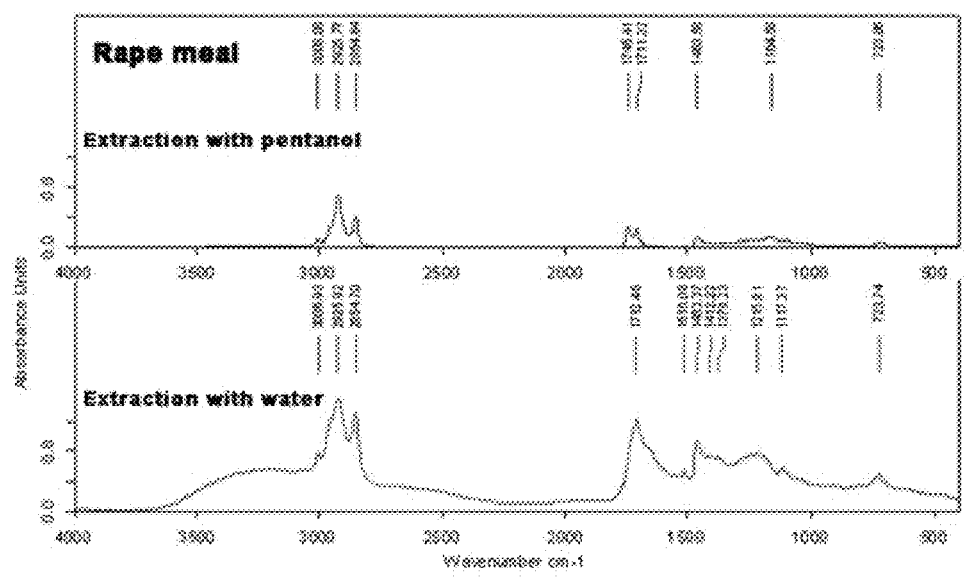
FIG. 14: FTIR spectrum of extracts from Rape meal with Pentanol and water

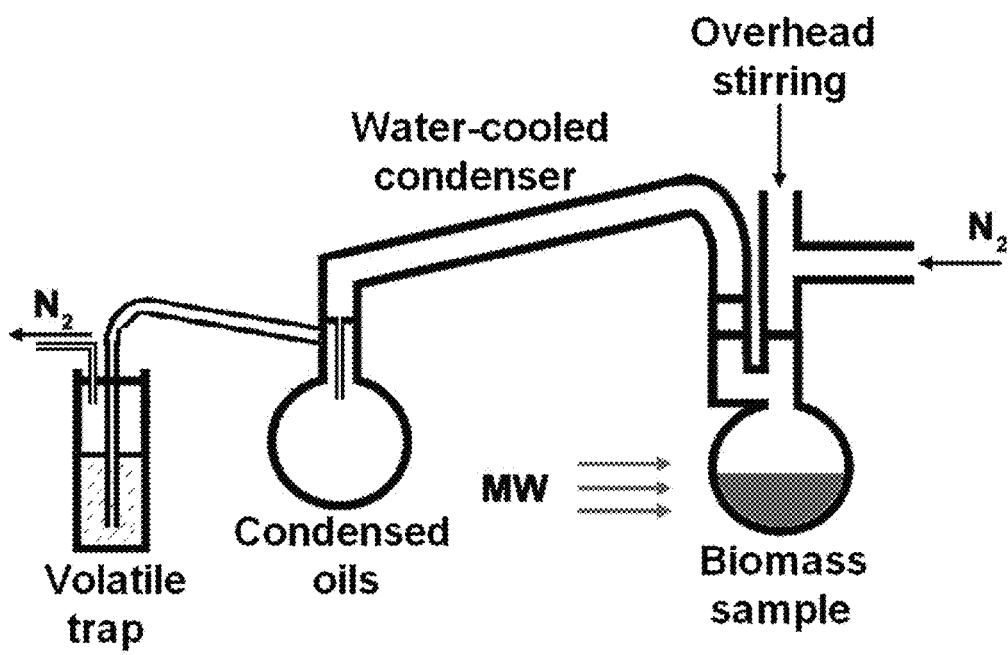
FIG. 15: Scheme of the apparatus set-up for microwave extraction of secondary oil from biomass with capture of highly volatile components.
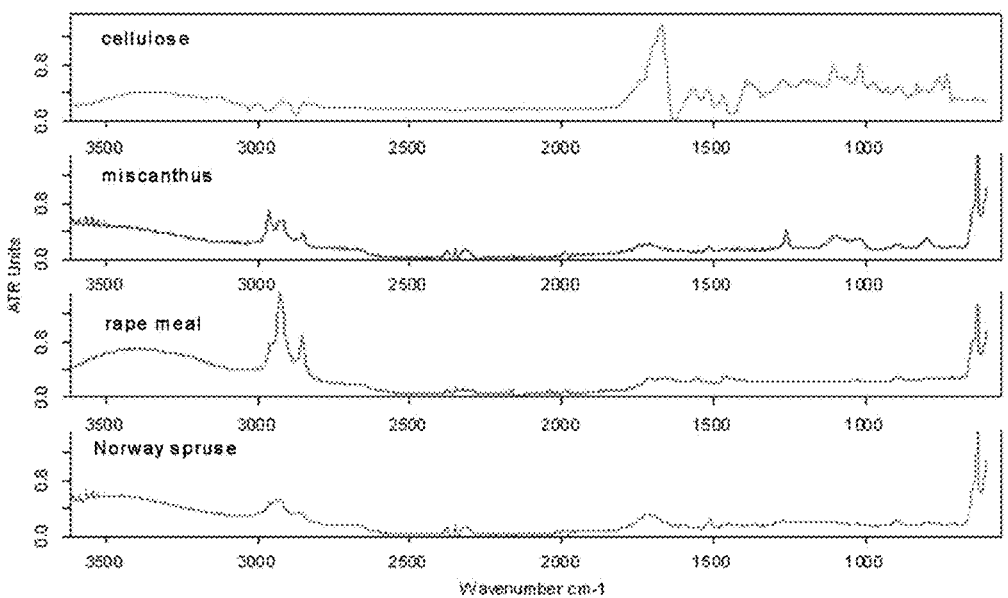
FIG. 16: FTIR spectrum of extracts from cellulose, miscanthus, rape meal and Norway Spruce.

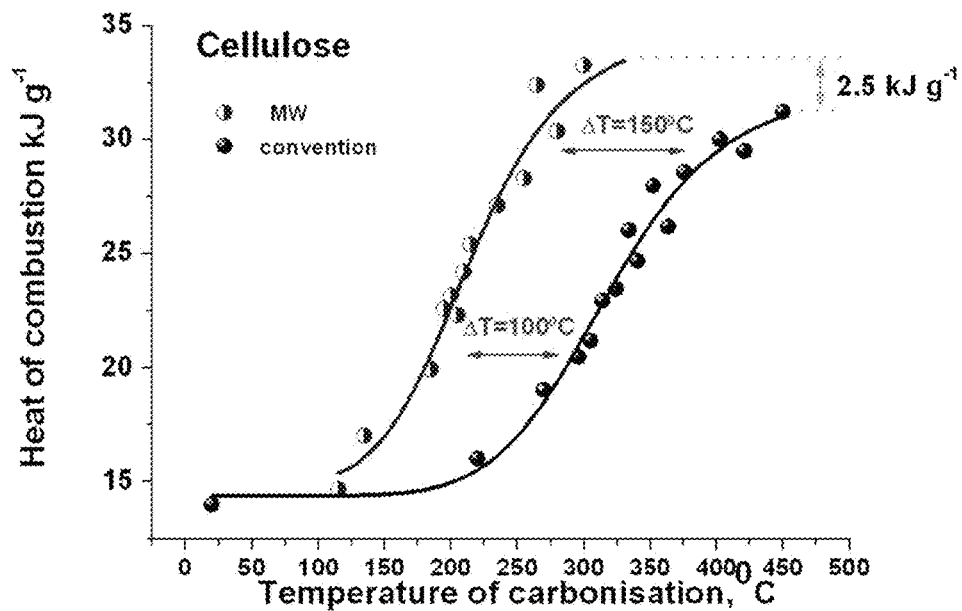
FIG. 17: Calorific value of cellulose chars produced by conventional pyrolysis and microwave irradiation at different temperatures.
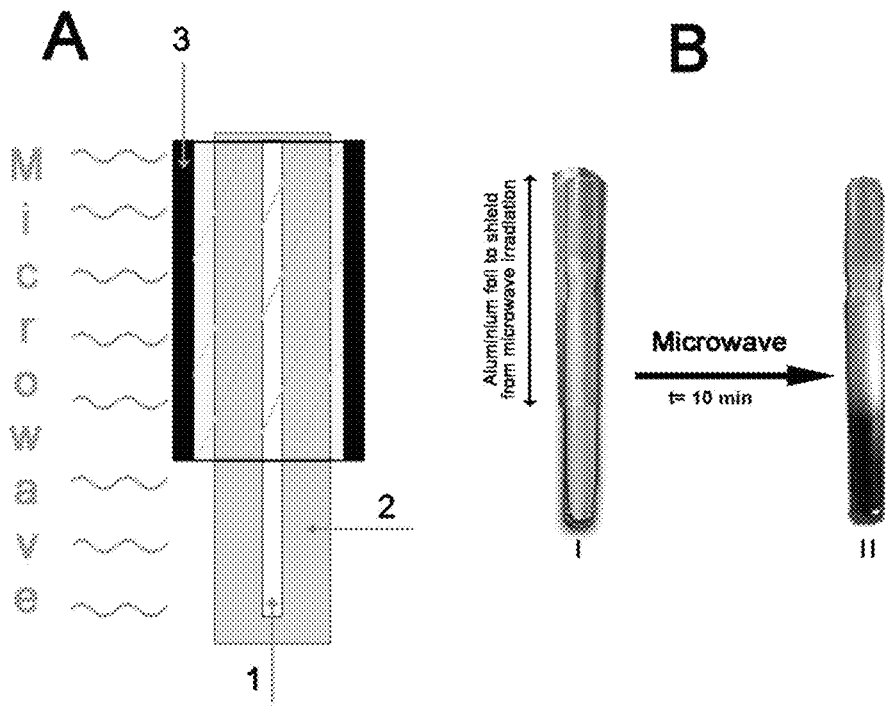
FIG. 18. Direct microwave effect on cellulose.

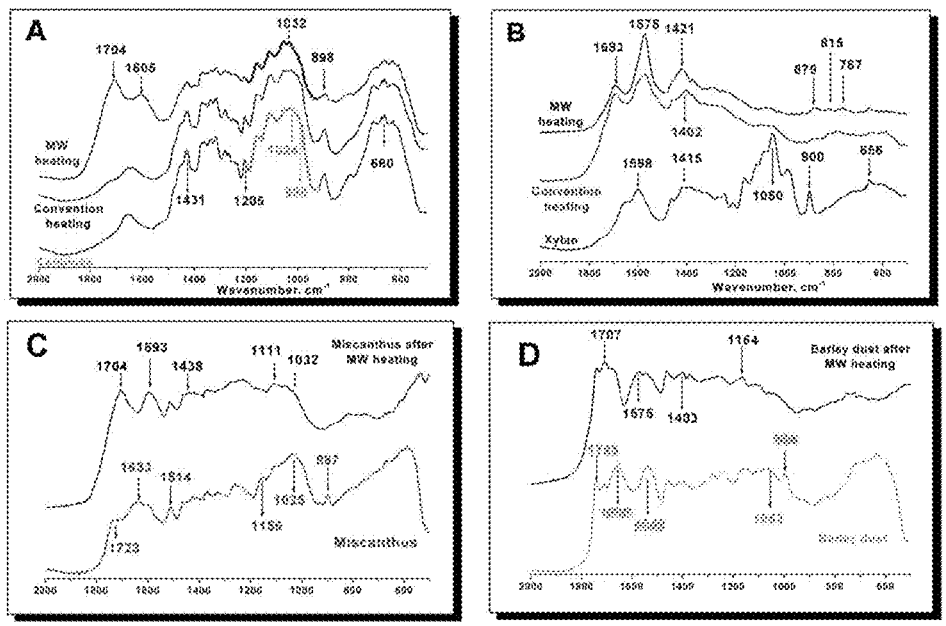
FIG. 19. FTIR different types of biomass before and after microwave irradiation.
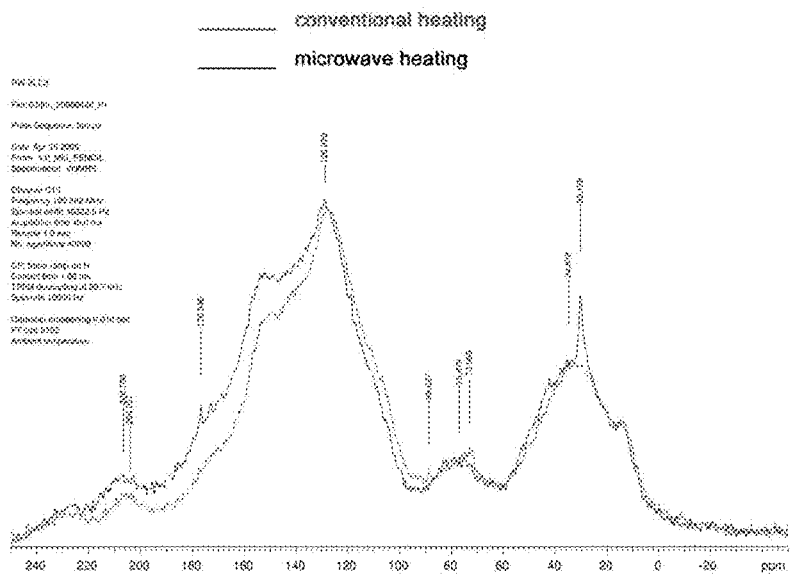
FIG. 20. 13C NMR of cellulose chars of same elemental composition produced by conventional pyrolysis and microwave irradiation.

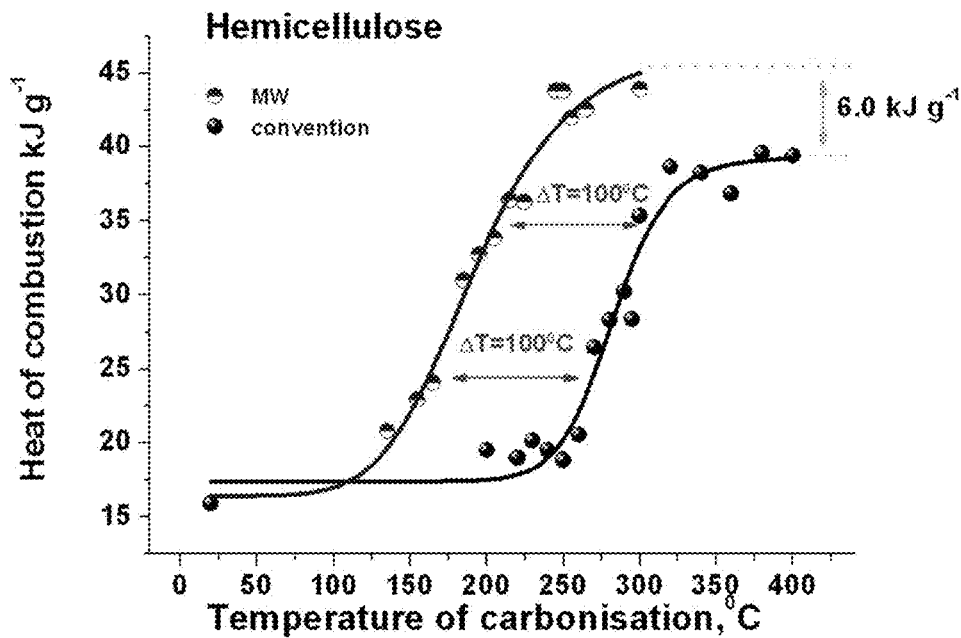
FIG. 21: Calorific value of hemicellulose chars produced by conventional pyrolysis and microwave irradiation at different temperatures.
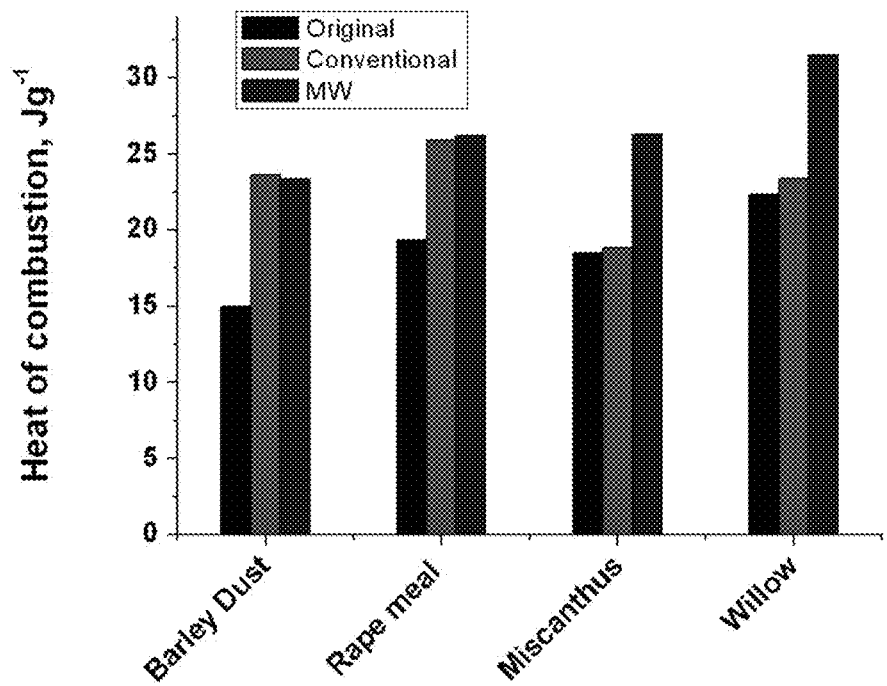
FIG. 22. Heat of oxidation values for biomass samples before and after MW irradiation.

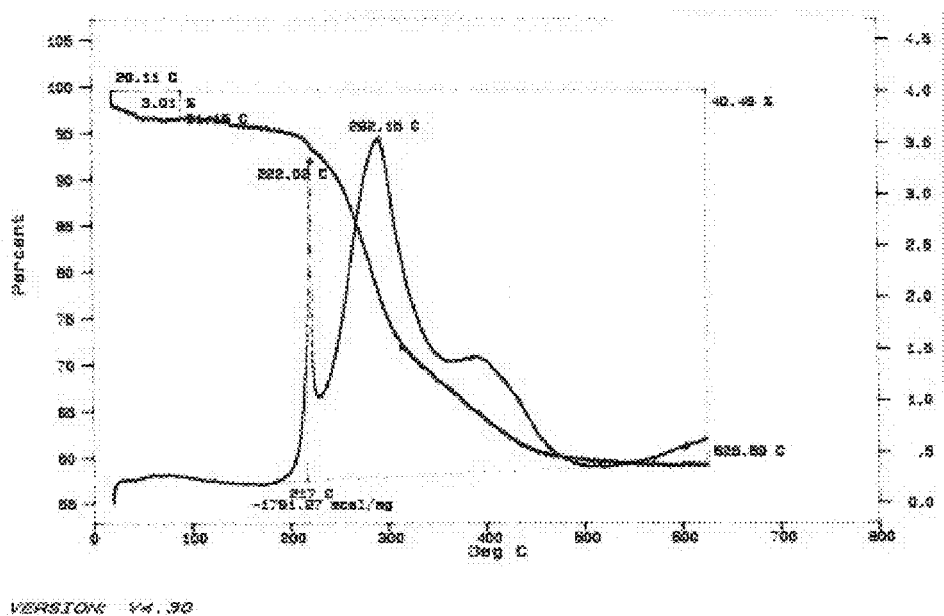
FIG. 23: STA profile of Barley dust mixed with PdO as an oxidant to measure heat of combustion
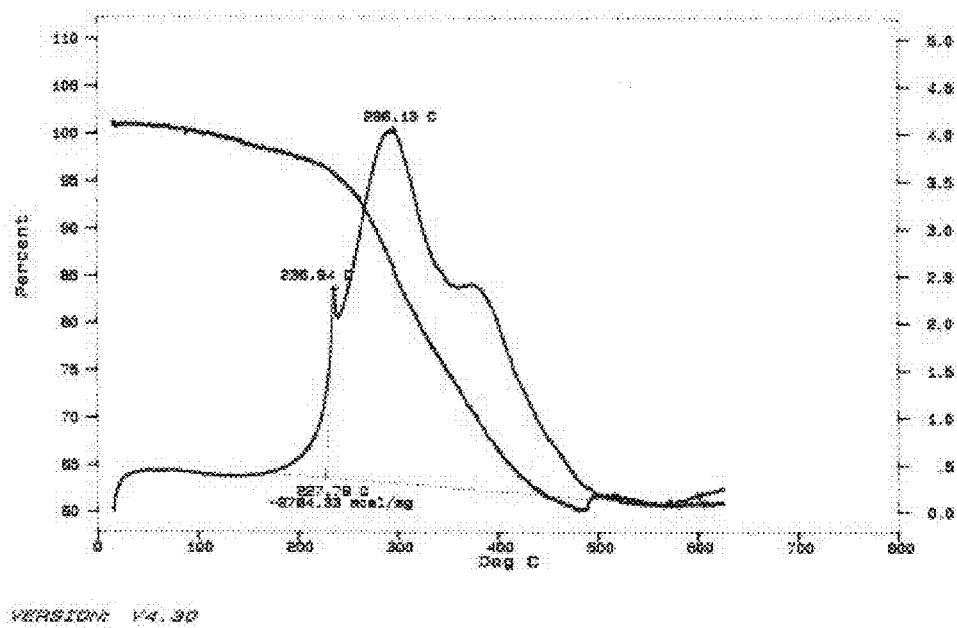
FIG. 24: STA profile of Barley dust after microwave processing for 30 minutes at 300W. Mixed with PdO as an oxidant to measure heat of combustion.

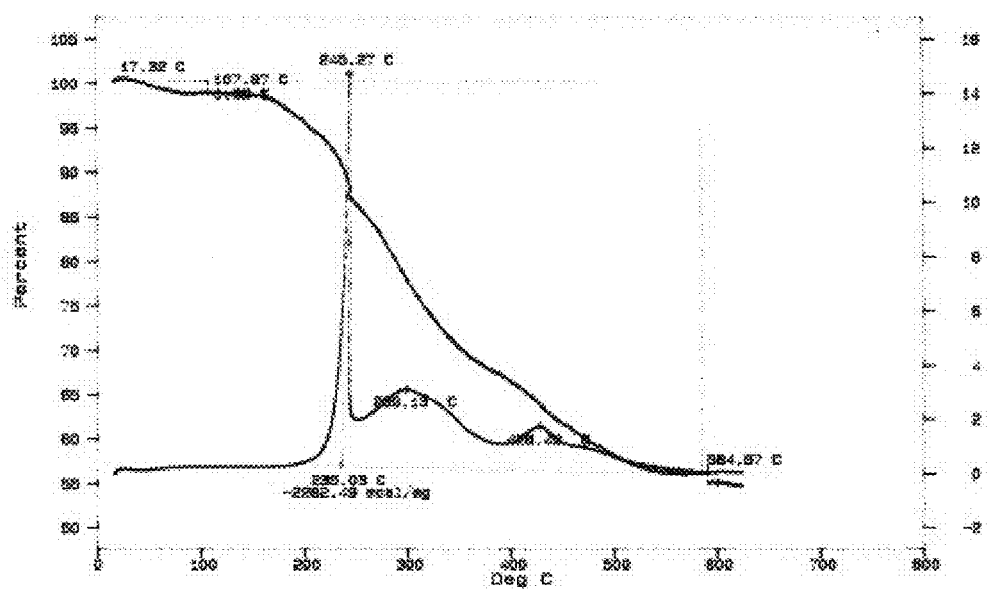
FIG. 25: STA profile of Rape meal. Mixed with PdO as an oxidant to measure heat of combustion.
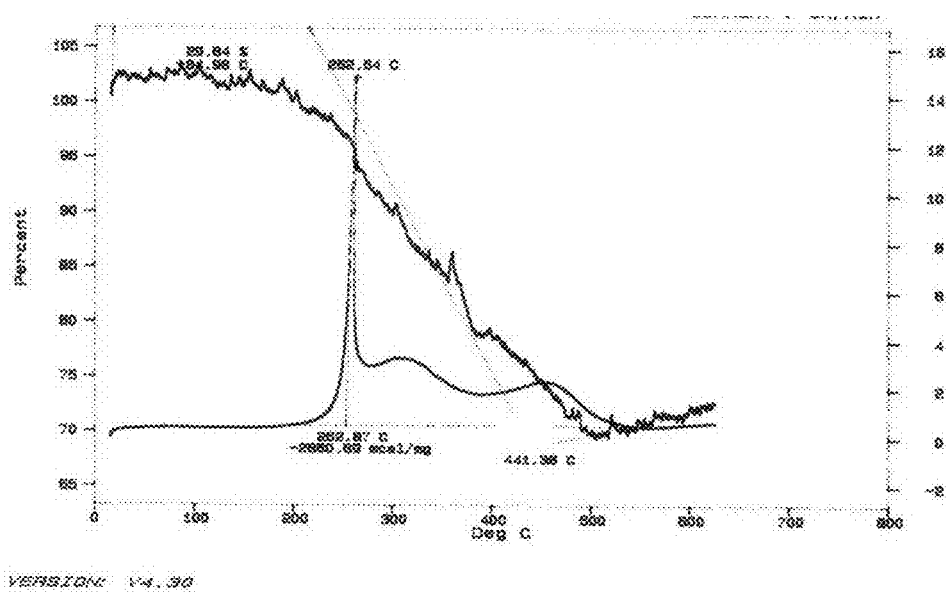
FIG. 26: STA profile of Rape meal after microwave processing for 30 minutes at 300W. Mixed with PdO as an oxidant to measure heat of combustion.

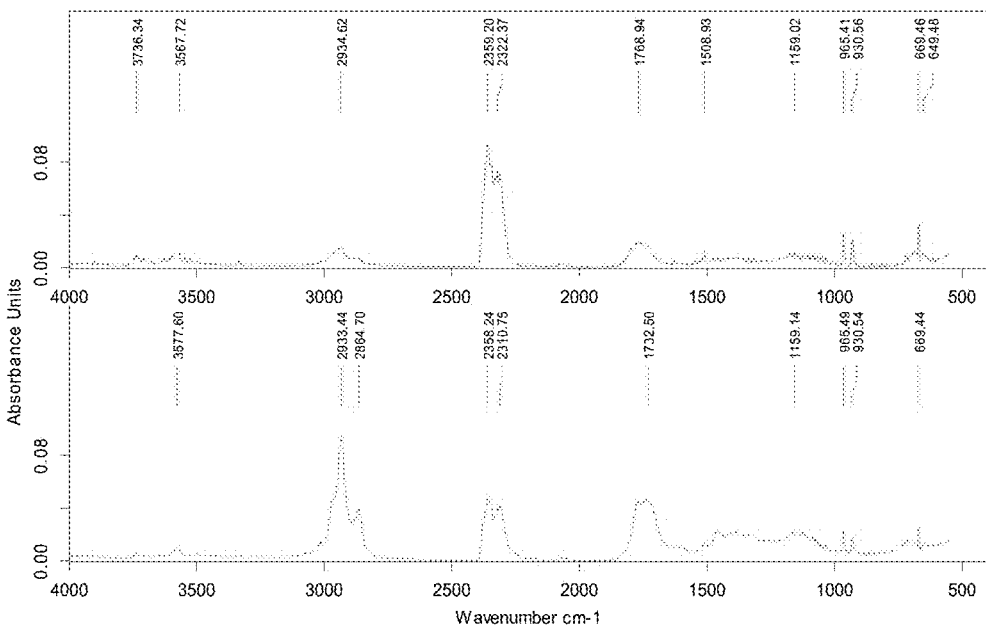
FIG. 27: TGIR experiment. IR spectrums of volatiles at temperature 330°C for Rape meal before (bottom) and after (top) MW.
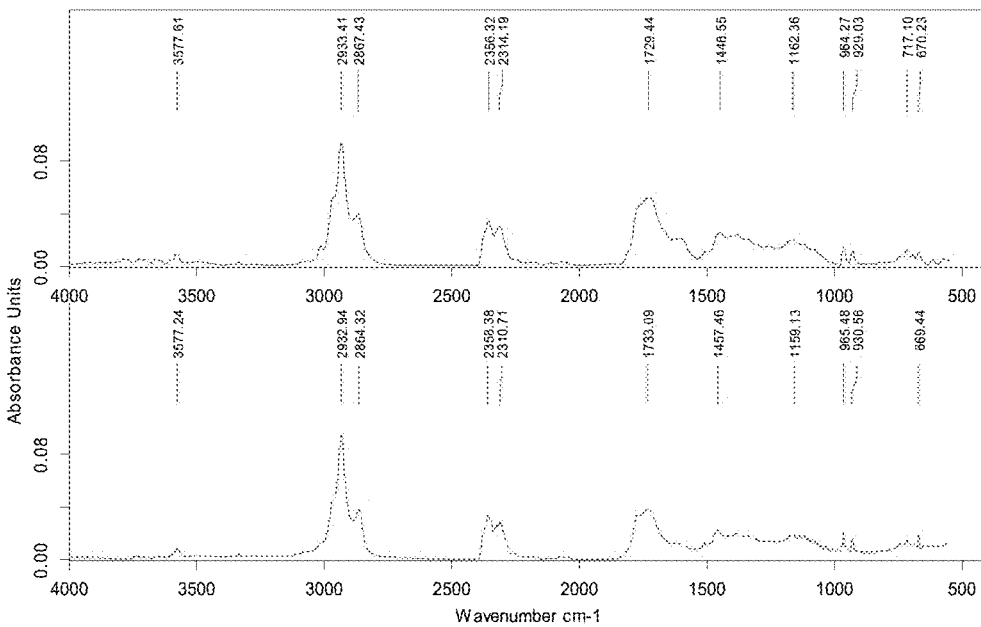
FIG. 28: TGIR experiment. IR spectrums of volatiles at temperature 390°C for Rape meal before (top) and after (bottom) MW.

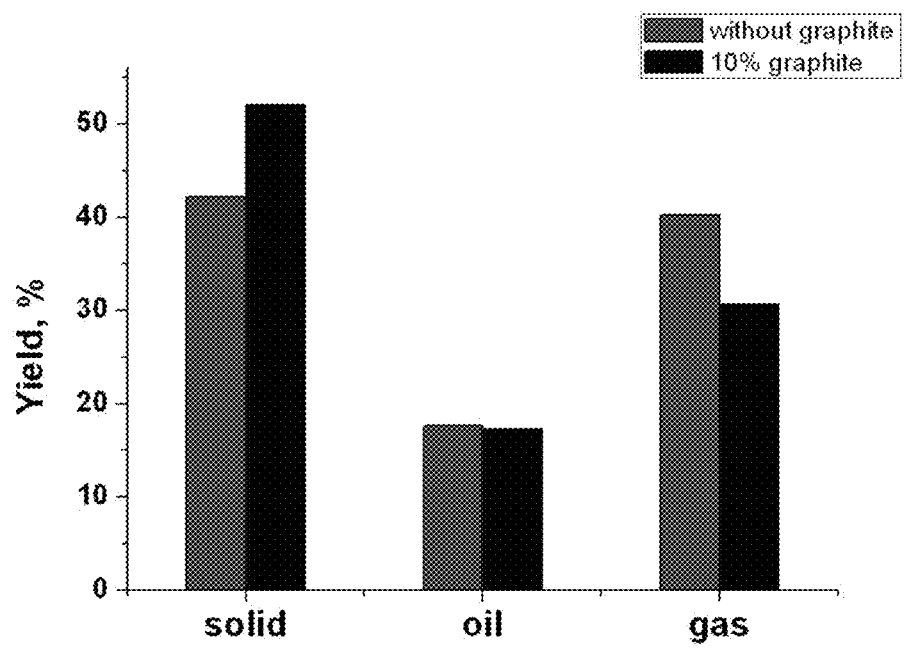
FIG. 29: Microwave thermal treatment. Influence of graphite on the product distribution.
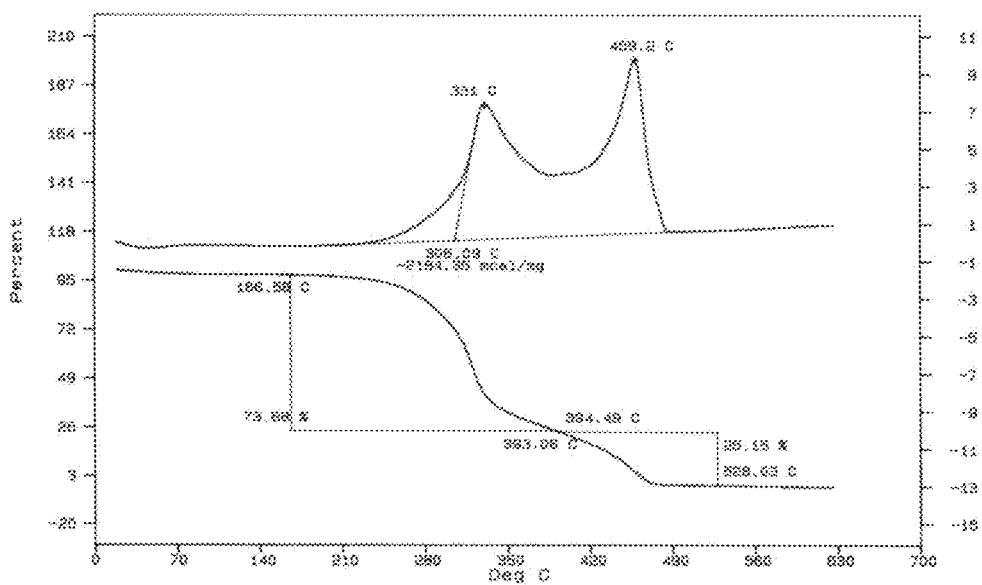
FIG. 30: Pine wood STA before microwave treatment

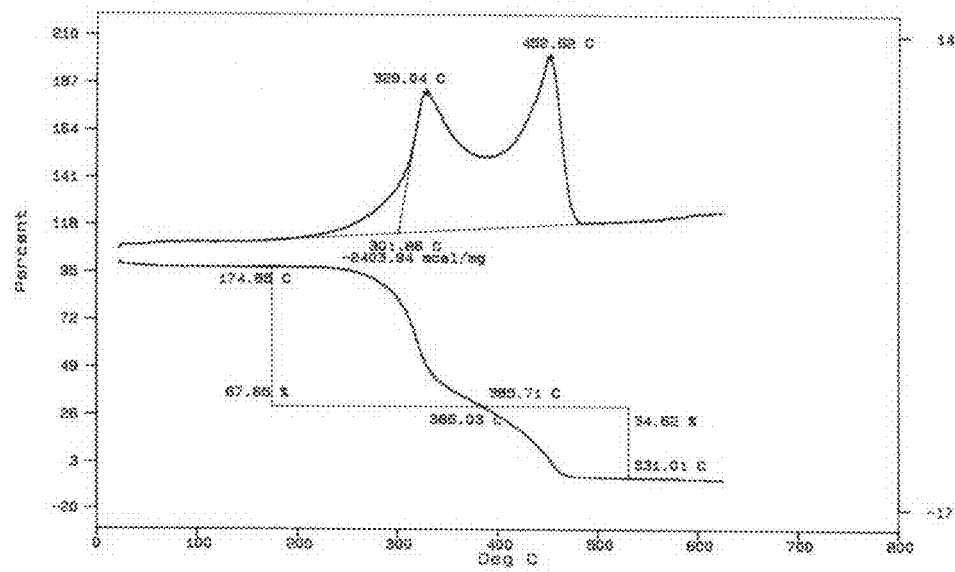
FIG. 31: Pine wood STA after microwave treatment
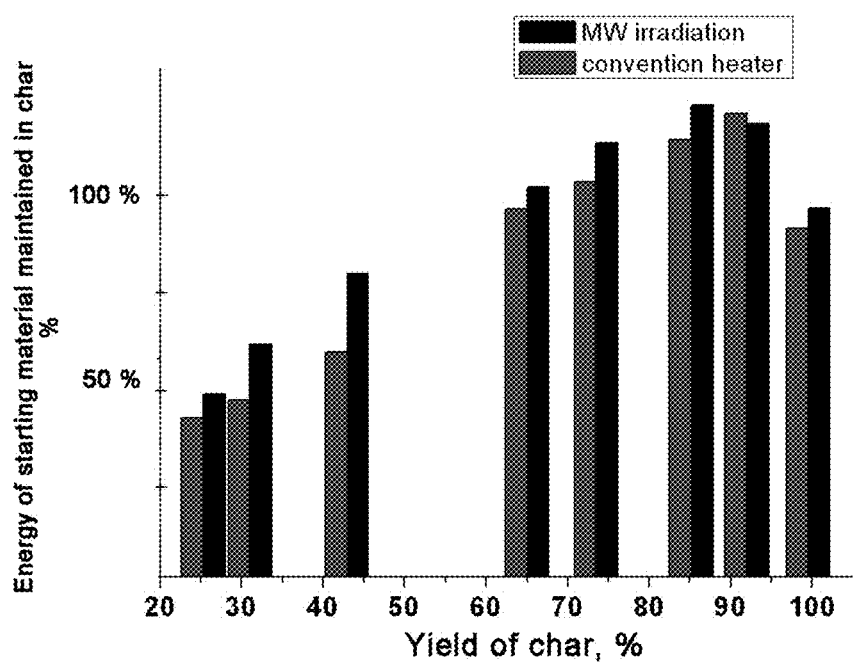
FIG. 32: Percentage energy per gram of starting material maintained in the char

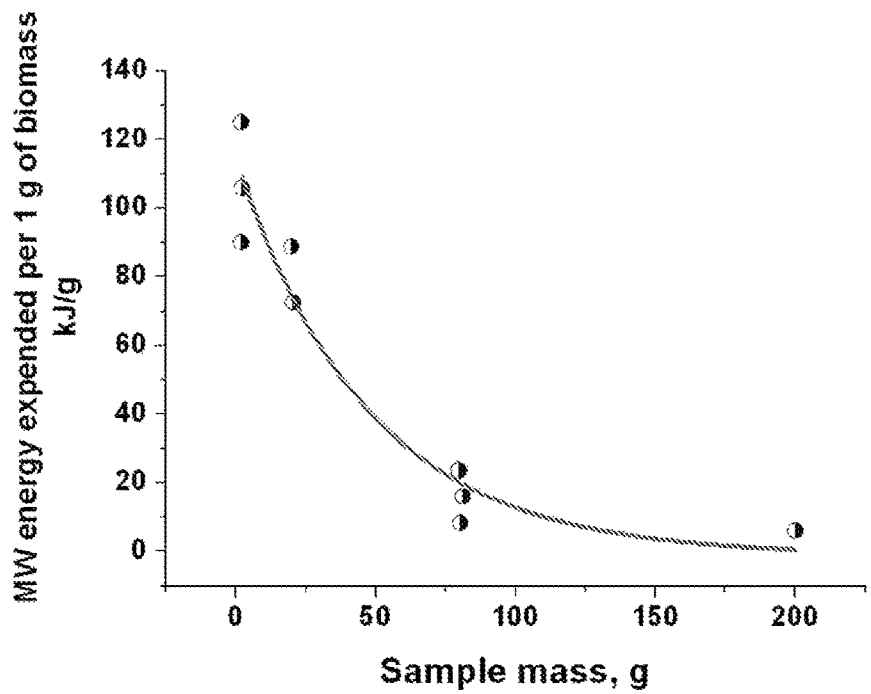

FIG. 33: Energy input for microwave torrefaction at 270 °C for different sample masses Table 2.1: Results of Analysis of scaled up Rape Char

| Method Reference | | | Units | Results | | | |
|---|---|---|---|---|---|---|---|
| | | | | As Received | As Analysed | Dry | Dry Ash Free |
| | | Total | % | 3.7 | - | - | - |
| qpiP/05 | Moisture | Free | % | 0.54 | - | - | - |
| caIP/03 | | Inherent | % | - | 3.16 | | |
| caIP/01 | | Analysis | % | - | 3.14 | - | - |
| caIP/O? | | Ash | % | 17.5 | 17.6 | 18.1 | - |
| caIP/04 | Proximate | Volatile Matter | % | 22.7 | 22.9 | 23.6 | 28.8 |
| caIP/26 | | Fixed Carbon | % | 56.1 | 56.4 | 58.3 | 71.2 |
| caIP/01 | | Total Sulphur | % | 0.54 | 0.54 | 0.56 | 0.68 |
| caIP/06 | | Chlorine | % | 0.01 | 0.01 | 0.01 | 0.01 |
| astmD5373 | Ultimate | Carbon | % | 66.4 | 66.8 | 68.9 | 84.2 |
| astmD5373 | | Hydrogen | % | 2.28 | 2.29 | 2.36 | 2.89 |
| caIP/25 | | Hydrogen (calc.) | % | 3.52 | 3.54 | 3.65 | 4.46 |
| astmD5373 | | Nitrogen | % | 5.84 | 5.87 | 6.06 | 7.40 |
| caIP/07 | Calorific Value | Gross | kJ/kg | 26028 | 26175 | 27024 | 33003 |
| caIP/25 | | Net(H calc.) | kJ/kg | 25144 | - | - | - |
| caIP/25 | | Net(H det.) | kJ/kg | 25407 | - | - | - |
| - | | Energy | MWh/t | 7.058 | - | - | - |

Sulphur = 0.54%  CV = 27,000 kJ/kg

FIG. 41

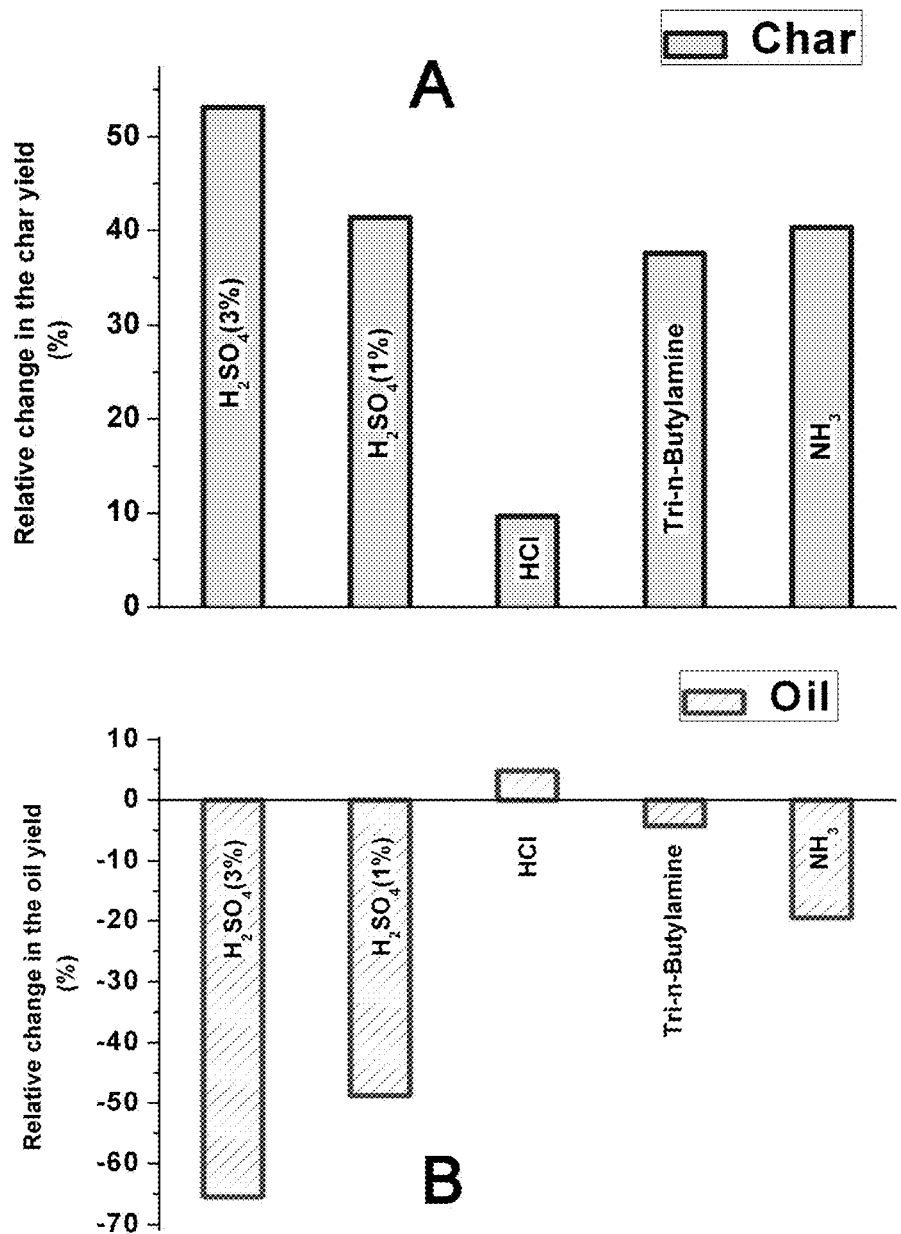
FIG. 34: Microwave torrefaction of wheat straw. Influence of acid/base additives on the relative change in A) char yield and B) oil yield.

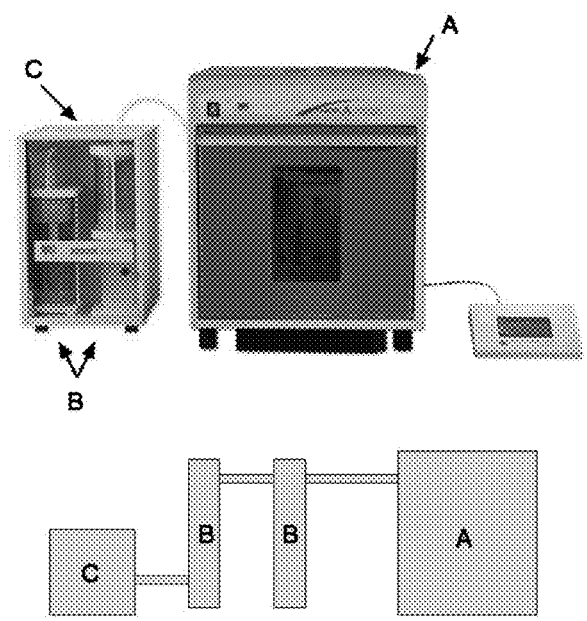
FIG. 35: Scheme of microwave experiment: A) Milestone microwave. B) Condensers. C) Vacuum pump.
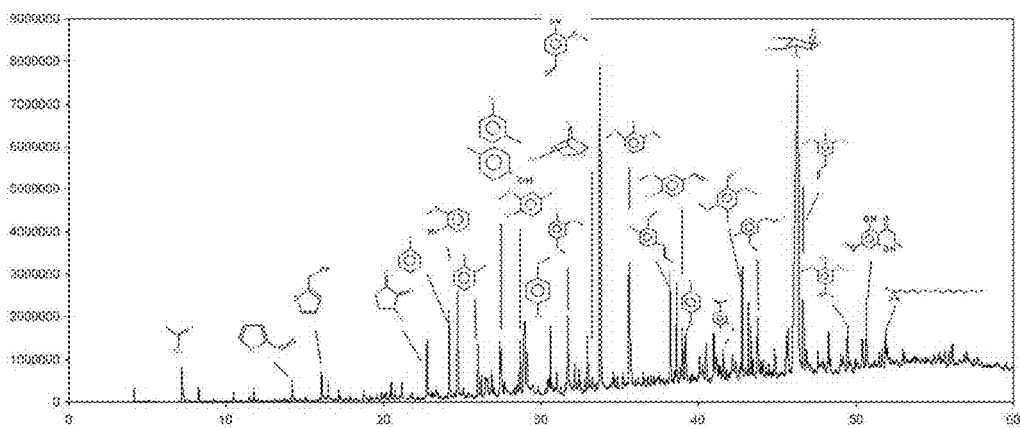
FIG. 36: GC-MS trace of wheat straw MW-pyrolysis oil

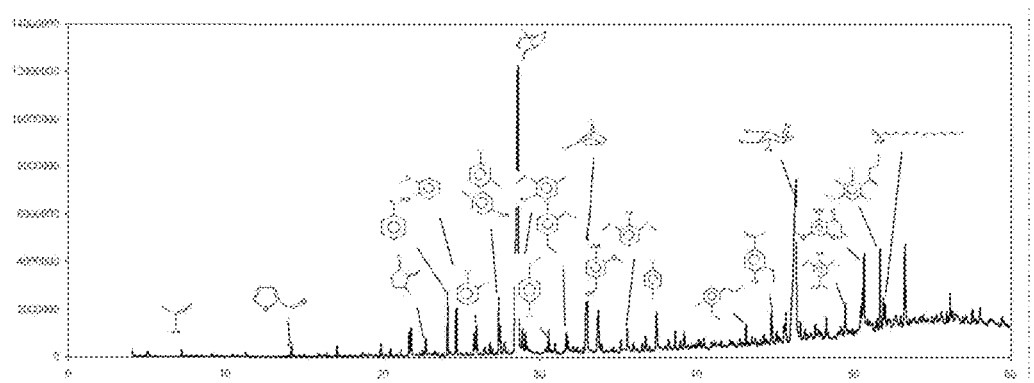
FIG. 37: GC-MS trace of wheat straw MW-pyrolysis oil prepared in the presence of $H_2SO_4$.
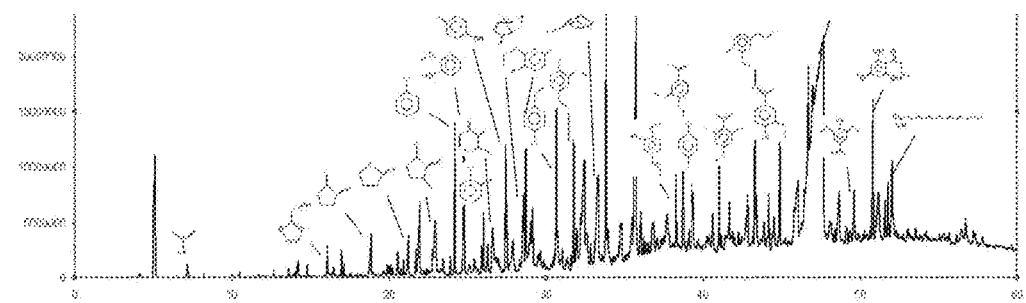
FIG. 38: GC-MS trace of wheat straw MW-pyrolysis oil prepared in the presence of HCl.
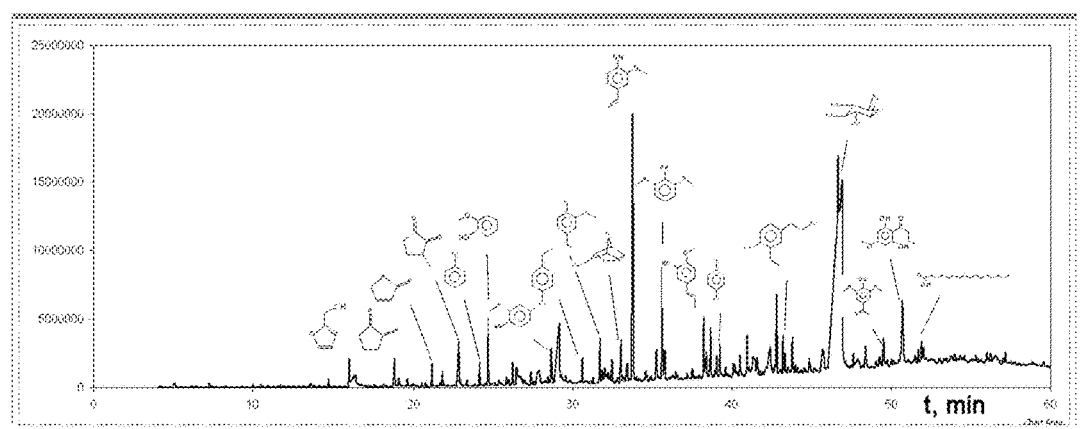
FIG. 39: GC-MS trace of wheat straw MW-pyrolysis oil prepared in the presence of ammonia.

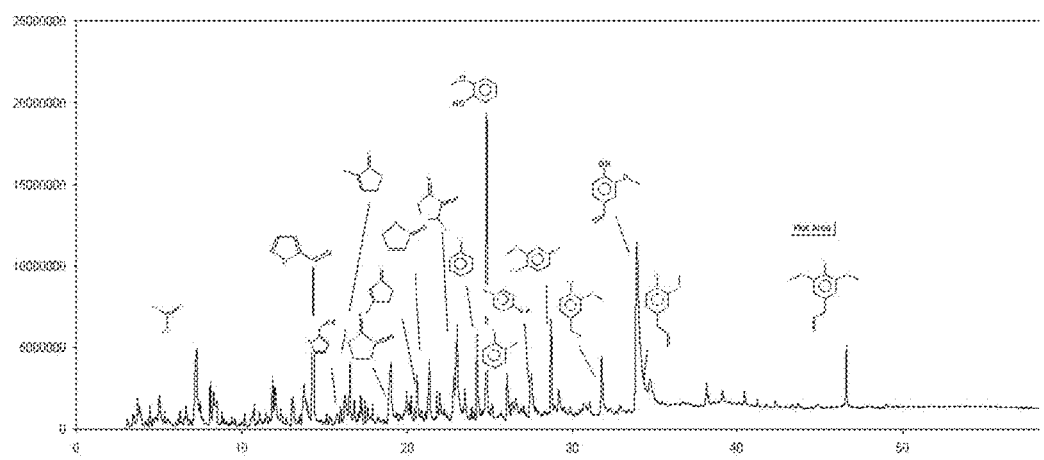
FIG. 40: The pyrolysis-GC-MS trace for the fast pyrolysis of wheat straw at 600°C.

Table 2.2: Results of Analysis of scaled up Rape Char – Metal impurities

| Trace Element Analysis | | |
|---|---|---|
| Element | Result mg/kg | Limit mg/kg |
| Arsenic* | 0.10 | 5 |
| Cadmium* | <0.01 | 3 |
| Chromium* | 0.4 | 30 |
| Copper* | 5.7 | 50 |
| Lead* | 0.1 | 20 |
| Mercury* | <0.01 | 0.10 |
| Nickel* | 0.4 | 30 |
| Vanadium* | 0.1 | 20 |
| Zinc* | 67.9 | 80 |
| Boron* | 14 | -- |
| Fluorine* | 3455 | ~ |

Arsenic = 0.1 mg/kg (limit- 5 mg/kg)
Lead= 0.1 mg/kg (limit- 20 mg/kg)
Lead= 0.01 mg/kg (limit- 0.1 mg/kg)

FIG. 42

Table 2.3:: Particle size distribution

| Particles size (μm) | % of sample |
|---|---|
| >600 | 49.1 |
| 300-600 | 12.65 |
| 150-300 | 14.91 |
| 75-150 | 9.84 |
| <75 | 13.48 |

Mean particle size<300 μm

FIG.43

MICROWAVE TORREFACTION OF BIOMASS

CROSS-REFERENCE TO RELATED APPLICATIONS

This application is a national phase application of International Application No. PCT/GB2009/001672 (PCT Pub. No. WO/2010/001137), filed Jul. 3, 2009, which claims priority to Great Britain Application Nos. 0812288.9, filed Jul. 4, 2008, and 0901150.3, filed Jan. 26, 2009, the entire contents of each of which are incorporated herein by reference.

FIELD OF THE INVENTION

The present invention relates to the processing of biomass, such as microwave torrefaction of biomass, and the invention provides microwave technology based on a range of acid/base additives which will be able to control mass ratio between different products (char/oil/gas), char properties and oil composition.

Moreover, this aspect of the invention provides a novel process to certain biomass derived products, such as L-glucosan.

Furthermore, the present invention relates to the processing of biomass to produce a micronisable biomass char which is useful, inter alia, as a biofuel, by the use of microwave technology. This aspect of the invention in particular provides microwave assisted torrefaction of polysaccharide rich plant biomass, and non-lignocellulosic biomass.

In addition, the present invention pertains to a processor for microwave torrefaction of materials, in particular, but not exclusively biomass. We define the biomass as organic matter available on a renewable basis. Biomass includes forest and mill residues, agricultural crops and wastes, food wastes, wood and wood wastes, animal wastes, livestock operation residues, aquatic plants, fast-growing trees and plants, and municipal and industrial wastes.

BACKGROUND OF THE INVENTION

The use of biomass for isolation of bio-oils, biochar and for energy production faces several problems due to, inter alia, its low energy density as a fuel.

The influence of chemical active additives on high temperature microwave pyrolysis, though not torrefaction, of biomass has been investigated just by few teams. For example, the effect of additives such as, sodium hydroxide (NaOH), sodium formate (HCOONa), sodium bicarbonate (NaHCO$_3$), silicon dioxide (SiO$_2$) and calcium hydroxide (Ca(OH)$_2$) on the microwave processing of biomass has been studied by Barbara Krieger-Brockett in 1994[1]

[1] B. Krieger-Brockett, "Microwave pyrolysis of biomass", Res. Chem. Intermed., 1994, 20, 39-49

M. Chen et al[2] investigated eight inorganic additives (NaOH, Na$_2$CO$_3$, Na$_2$SiO$_3$, NaCl, TiO$_2$, HZSM-5, H$_3$PO$_4$, Fe$_2$(SO$_4$)$_3$) in terms of their catalytic effects on the pyrolysis. Experiments were carried out at ca. 470° C. under dynamic nitrogen atmosphere. It was found that all additives have significantly increased yields of solid products; however yield of liquid wasn't changed substantially. They also found that additives can change the composition of the organic products. Furfural and 4-methyl-2-methoxy-phenol have been identified as the two dominant organic components in the liquid products obtained from MW pyrolysis of acid (H$_3$PO$_4$ and Fe$_2$(SO$_4$)$_3$) treated samples. Notably L-glucosan (levoglucosan) was not found or found only in trace amounts in the liquid products from pyrolysis of sawdust by microwave heating both in control microwave experiment and in the presence of inorganic additives. Furthermore, calorific values of bio-char and acid number of bio-oil have not been estimated.

[2] Chena M., Wanga J., Zhanga M., Chena M., Zhub X., Mina F. and Tanc Z. "Catalytic effects of eight inorganic additives on pyrolysis of pine wood sawdust by microwave heating", Journal Of Analytical And Applied Pyrolysis 2008, 82, 145-150.

Furthermore, conventional fuel furnaces, such as those used in coal fired power stations require the fuel to be pulverized or micronised. For example, coal for burning in a power station furnace will usually be pulverised to increase the fuel surface area. This also provides more efficient combustion, more complete burnout, lower emissions, and better heat liberation rates.

One particular disadvantage identified with the use of biomass in energy production is that whilst the biomass may be shredded is has thus far not been possible to achieve micronised particles sizes of biomass or biomass char which would be suitable for use in conventional furnaces and or for burning when admixed with conventional fuels, such as coal.

Several options are available for the valorisation of biomass for energy production although none can result in increasing the overall energy available from the biomass. The three core options are seen as 1. gasification, a high temperature process of degradation of biomass to produce gases which can then be used for energy production;
2. pyrolysis, a medium to high temperature process where the biomass is degraded to yield mainly oil products for energy production; and
3. torrefaction, a low temperature process for the production of solid fuels with an increased energy density than the original biomass.

Under conventional heating conditions gasification is carried out between 750-1800° C., pyrolysis generally above 400° C. and torrefaction between 200 and 300° C.

In terms of method of production of an improved fuel, each of these has inherent problems. Gasification is an endothermic process and occurs at very high temperature so requires significant energy input to drive the process. The major product of pyrolysis processes is oil, with typical yields of 60-70%. The so-called "bio-oil" is easier to transport than the gas products of gasification but suffer reduced fuel efficiency due to high water content, phase separation and corrosive properties which make long-term storage an issue. Although torrefaction offers the lowest energy demand of all these processes, as it operates at the lowest temperature, and offers a product which burns cleanly there are several problems associated with the process.

In conventional processes difficulties arise in strict control of operating temperature, it is necessary to ensure the process does not go above 300° C.

The maximum achievable calorific value is usually much lower than that of coal, expected to be from 18 to 23 kJ/g (8000 to 10000 Btu/lb).[2]

The production costs are high.

These problems have, along with a complex system, prevented torrefaction of biomass for fuel from practical commercial use. Various routes such as catalysis have been investigated in order to improve the process but still the process has not been optimised to a point where it can perform on a commercial scale. As a result of the problems faced in conventional torrefaction we have chosen to investigate microwave torrefaction as an easily controlled mobile technology and for increasing the energy density of biomass for use as fuel.

Microwave torrefaction, as defined here, has not been reported in literature. The following is a review of the current state of the art of microwave gasification and pyrolysis which are generally carried out at temperatures above 300° C.

Microwave irradiation is defined as "electromagnetic irradiation in the frequency range of 0.3 to 300 GHz". Similar to domestic microwaves, specialised chemistry microwave reactors operate at 2.45 GHz. Microwave radiation is used in several applications including radar, communications, radiometry, medicine, physics, chemistry, and cooking food. Compared to conventional heating techniques a microwave process is advantageous in terms of shorter reaction times, higher heating efficiencies and greater control. The advantages of microwave technology in terms of mobility of small scale processors and value in waste reduction applications have been highlighted by Ruan et el.[1] The use of microwaves is well established in many industrial and commercial applications. Microwave treatment of biomass is used before and or during extraction processes. The use of microwave for extraction of oil is gaining significantly in terms of commercial importance and wide spread utilization. It is employed in extraction of primary plant oils as well as extraction of petroleum oils from drilling muds, tar and sands. Microwave ovens have gained acceptance as a mild and controllable processing tool. Microwaves allow simple, rapid and low solvent consuming processes. Microwaves are already widely used for extraction of oil from solid to liquid (CEM-2005). The use of microwaves is also growing in the processing of materials. Microwave processing is now being used for "the production of advanced ceramics, the deposition of thermal barrier coatings, and the remediation of hazardous wastes" with new applications constantly being researched.

The use of microwaves for treatment of biomass is relatively new and dates back to the early 1970's. However, previous focus on microwave treatment of biomass has always been on high temperature pyrolysis, gasification and liquefaction of the starting material. Pyrolysis of biomass is usually conducted at temperatures above 350° C. Examples of substrates employed in this type of pyrolysis are numerous and include plant biomass such as wood or agricultural residues, plastics and municipal waste.

Low temperature pyrolysis, also known as torrefaction, is a thermal treatment usually carried out between 200 and 300° C. Torrefaction is a mild biomass pre-treatment process for upgrading the quality of biomass as fuel for combustion and gasification applications. Torrefaction can also be referred to as roasting, slow and mild pyrolysis and high temperature drying.

Conventional (non-microwave) torrefaction of biomass materials such as wood is well known. Torrefied wood has the moisture and most volatile organic compounds (VOC's) driven out resulting in a high percentage of carbon content. In addition, the chemistry and structure of the wood itself is converted into a new form by continued exposure to heat. Torrefaction of other biomass materials, such as those of plant origin, e.g. prunings and/or mown grass, or waste materials is also known.[2] However, the micronisation or pulverisation of such torrefied materials has proved unsatisfactory.

Use of Additives

In typical microwave pyrolysis one of the key requirements is the presence of dielectric materials which are good absorbers of microwave energy and transfers heat directly. Examples of additives include inorganic oxides, carbons (e.g. carboniferous additives, such as graphite) and/or water. Biomass is largely transparent to microwaves, meaning that it is not easy to heat it directly. The use of absorbers overcomes this limitation and enables fast heating rates. In addition it is important to note that as pyrolysis proceeds, more carbon is generated from the biomass and the microwave heating becomes progressively more effective.

The use of additives was also investigated by F. Yu, R. Ruan et al.[3] who employed char and NaOH and showed increased yields of oil and syn-gas respectively. They also observed variations in gas composition at elevated temperatures.

[3] E.g. Jenkins B. M., Baxter L. L., Miles Jr. T. R., Miles T. R. Combustion Properties of Biomass. Fuel Proc Technol. 54 (1998) 17-46i Microwave Gasification of Biomass Miura et al[4] and A. M. Sarotti et al[5] looked at the optimisation of microwave pyrolysis of cellulose and wood for production of levoglucosan. They investigated particle size, power and irradiation time and source of biomass on the distribution of products in terms of water, oil, gas and char and they also conducted chemical analysis of their oil. However, neither investigated the calorific (heating) value of the wood based biomass or the biomass components. The temperature of the process was not directly controlled and was only determined as a result of the microwave power input and sample residence time. In our work, we have found that the control of the process temperature along with the power input was vital for the production of products with reproducible properties.

[4] Evans R. J., Milne T. A. Molecular Characterisation of the Pyrolysis of Biomass. 1. Fundamentals. Energy & Fuels, 1 (1987) 123-137
[5] Nowakowski D. J., Jones J. M. Uncatalysed and potassium-catalysed pyrolysis of the cell-wall constituents of biomass and their model compounds. J. Anal. Appl. Pyrol. 83 (2008) 12-25.

Calorific value of microwave pyrolysis products of biomass have, however, been investigated by Menendez et al[6] who have investigated the effects of microwave irradiation for pyrolysis above 500° C. They used microwave energy to pyrolyse sewage sludge at irradiation of 1000 W and a final reaction temperature of 1000° C., with the aim to optimise the fuel properties of the gas produced. They found that microwave pyrolysis produces more gas and less oil than conventional pyrolysis and additionally the amount of hydrogen in the gas mixture is much higher especially at temperatures 500° C. The calorific values of the collected fractions were up to 7, 37 and 10 kJ/g for char, oil and gas respectively. In comparison to typical values for petroleum derived fuels with 32, 42, 14 kJ/kg for coal, oil and gas these values are relatively lower. However although heating values were higher for oils their yield was relatively small, meaning that the greatest percentage of energy was accumulated in the gas fraction, with the oil fraction containing the lowest relative percentage of the energy.

[6] Fahmi R., Bridgwater A. V., Thain S. C., Donnison I. S., Morris P. M. Yates N. Prediction of Klason lignin and lignin thermal degradation products by Py-GC/MS in a collection of *Lolium* and *Festuca* grasses. J. Anal. Appl. Pyrol. 80 (2007) 16-23.

They also tried to optimise the calorific value of char from biomass prepared between 500-1000° C. by microwave pyrolysis. They were unable to affect the calorific value with increased temperature. Moreover the calorific value of the char was similar to that prepared at the same temperature under conventional conditions (around 24 kJ/g).

Surprisingly, we have been able to produce char and oil fuel products from microwave torrefaction of biomass working at temperature between 120 and 300° C., resulting in a significant saving in energy input. The production of solid and oil fuel products is seen as favourable due to the ease of transport of the final product and their simple integration into current energy production systems. The decomposition of the biomass occurred at lower temperature and yielded a solid char of increased calorific value, comparable with coal.

Microwave Pyrolysis of Biomass for Liquefaction

Ruan et el[1]. and Heyerdahl et al. have investigated microwave biomass pyrolysis for the production of a liquid fuel. They worked at temperatures between 260-600° C., with optimum process conditions for liquefaction in the region of 350 and 600° C. Under these optimised conditions it was found that 50% of the biomass energy can be condensed into liquid products, just 20% in the char and the remaining 30% in the gas phase. The fuel properties of the char were not fully investigated. Analysis of the pyrolysis oil in terms of water content, density, pH, viscosity, elemental analysis and calorific value (CV) were reported. The properties reported, including calorific values, were in the range of similar bio-oils produced by conventional pyrolysis process and they were also similar to those disclosed in the present invention at around 19 kJ/g. However no discussion of how the properties of the oil product varied with processing conditions such as time, temperature, power or use of microwave activated additives was given. The authors reported that at elevated temperatures char yields could be decreased resulting in increased yields of hydrogen gas.

Microwave Pyrolysis of Biomass for Char Production

More recently, microwave induced pyrolysis has been investigated by Huang et al. They looked at pyrolysis of rice straw and have identified solid liquid and gaseous products. As they were unable to control temperature independently to power input, a calibration curve for a defined sample mass was prepared between for 50 W to 500 W, corresponding to a temperature interval of 105-563° C. The conditions for experimentation were set between 266-563° C. The calorific value of the rice straw solid residue results obtained was no more than 20 kJ/g, and no better than those achievable by conventional methods in this temperature range. They also found no correlation between the calorific value of the char and the microwave power/temperature. As a result of the poor calorific value of the char they investigated alternative applications for the solid, e.g. as absorbent (surface area up to 270 $m^2g^{-1}$). In our work we have found that it was possible, at temperatures lower than those reported, to prepare a char of higher calorific value, with the possibility to optimise the calorific value by control of microwave power and temperature. The char which we have produced is also physically different to those reported by Huang et al, with negligible measured surface area.

Although microwave pyrolysis of biomass above 300° C. from different sources has been investigated by other researchers the lower temperature process of microwave torrefaction for the production of a high calorific char has not been.

In microwave assisted torrefaction or pyrolysis of biomass a number of factors such as microwave power, reaction temperature and time, type of substrate and its moisture affect the efficiency of the process. However, as this disclosure demonstrates there may be additional factors which influence the efficiency of the process, for example, biomass densification and pre-treatment temperature.

These two aforementioned factors form the basis of the process disclosed in this invention and are a key advantage over existing microwave-assisted pyrolysis processes.

At a basic level density and size of biomass govern processing quantities, handling volumes and materials logistics. With increasing utilisation of biomass for renewable energy generation, densification techniques such as pelletisation and briquetting have become an essential prerequisite in biomass pre-processing. However, densification also influences the efficiency with which materials interact with microwaves. As demonstrated in Example 1.D densification enhances the efficiency of absorption of microwave energy and allows greater processing rates, which are essential in commercial application of this technology. Typically, simple densification techniques start with pulverisation of biomass followed by compacting the pulverised material into pellets, briquettes or continuous rods or logs. The compacting process involves pressing particles into desired shapes, for example, by means of a press wheel (pellets) or screw extrusion into a dye of determined shape. Heat is generated during the compression as a result of increasing pressure. This causes the lignin (plus other components) in the biomass to melt and/or flow to envelop and bind the particles in the desired final shapes. In some instances adhesives or adhesion promoting compounds may be added to affect the binding or particles may be heated in the process to cause the flow or setting of the binder. The resulting products, for example, pellets, briquettes or rods, exit the processor, or stage of processing, hot and it is this heat that is utilised in the process disclosed herein.

Biomass pre-heating in microwave-assisted pyrolysis of biomass is an important factor of this disclosure. A number of preceding inventions suggest preheating of biomass to minimise microwave power input.

For example, the disclosure of U.S. Pat. No. 5,084,141 suggests preheating organic material with a heated gas stream to temperatures above 250° C. and preferably between 300 and 500° C. However, this disclosure does not provide an informed explanation why these temperatures might be beneficial. Carbohydrate based biomass and, in particular, lignocellulosic plant biomass, does not interact well with microwaves to generate efficient heating. Many microwave absorber additives such as graphite have been explored in the patent and scientific literature to indirectly induce heating to non-absorbing substrates to overcome this shortfall. However, as this disclosure demonstrates, heating is an important pre-requisite to microwave-assisted biomass torrefaction.

At elevated temperatures, the main components of biomass interact more efficiently with microwave irradiation. At about 180° C. cellulose, typically the major component of plant biomass, undergoes a physical transition which increases the mobility of the cellulose polymer chains. This allows better charge transfer interactions between hydroxyl and/or other functionalities on the chains (or hydrogen-bonding network) and tends to increase electric conductivity. This in turn enhances interaction with the electromagnetic field of the microwave irradiation. Furthermore, it also affects the chemical reactions pathways involved in the decomposition of cellulose by altering the activation energies associated with charge transfer and other reactions as a result of proximity of functional groups in more mobile polymeric systems. This, coupled with the increased polarity of functional groups, is responsible for the different chemical composition of the resulting products observed in microwave-assisted processes compared to conventional pyrolysis systems. Similar physical changes occur for hemicellulose, but typically at lower temperatures of around 160° C. Physical transitions in lignin can occur at lower temperatures, but in a broader, less defined, manner. Additionally, the extended three dimensional structural network, as well as fewer hydroxyl functionalities, means that the activation effect is less pronounced for lignin.

Lignin, hemicellulose and cellulose are the main structural components of biomass, with the latter usually representing the largest proportion. In order to fully take advantage of the activation phenomenon, biomass should be preheated to around 180° C. At this temperature all structural components are activated and a relatively low power of microwaves and/or short irradiation time (within seconds) is required to affect the decomposition reactions and carbonisation. Furthermore, under these conditions the fast rates of reaction enable homogeneous decomposition of the samples. Lower temperatures are acceptable, but do not take full advantage of the activation phenomenon across all components and thus reaction rates are slower. The resulting chars are less homogeneous under comparable irradiation times with charring occurring from inside out. Furthermore, at lower temperatures fractions of volatiles are significantly lower and the calorific values of the resulting chars are poor. Higher pre-treatment temperatures are unnecessary and uneconomical, and too high a temperature in excess of 300° C. can cause premature thermal degradation and/or undesirable decomposition reaction pathways.

The process utilised in the present invention takes full advantage of the densification and preheating phenomena. It integrates two elements: densification and microwave torrefaction equipment in a continuous fashion.

The first element compresses the sample(s) to maximise throughput and/or the amount of material available for absorption of microwave energy. In the process the sample(s) are preheated due to mechanical friction and compression (and potentially additional chamber, wheel or screw heating, depending, inter alia, on the equipment design and type of biomass), but rather than dissipate that heat, as in conventional processes, the energy is directly utilised for the second element of the process: microwave decomposition. In this manner the first element not only provides densification, but also an efficient preheating method. Preheating has been described in other patents, such as, U.S. Pat. No. 5,084,141 for preheating biomass, but the use of gas, infrared or other methods requires additional energy and is less efficient, in particular for larger particles. Because the thermal diffusivity of biomass is poor these methods largely preheat the surface and not the core of the particle. In the invention disclosed herein heat is transferred to individual particles which are then compressed to the desired size/shape and, although a temperature gradient between the core and the surface is likely, it is still a more effective way of preheating the sample and it utilises the "waste" heat of the first process rather than requiring additional heating energy.

U.S. Pat. No. 7,101,464 discloses using heat generated from the pyrolysis process for preheating waste tyres prior to microwave pyrolysis, but this process does not integrate densification and is less applicable to biomass where (1) anaerobic conditions are required to suppress burning and thus large volumes of inert gas is needed; and (2) the exhaust gasses from pyrolysis, which contain valuable chemical products, can be lost or exposed to prolonged heating and microwave irradiation.

The importance of maintaining low temperatures during microwaving of biomass to produce chemically functional oils has been highlighted in U.S. Pat. No. 3,843,457 which employs low temperature microwave induced plasma under vacuum for pyrolysis of waste (largely carbohydrates). This helps to preserve chemical functionality and produce higher value chemical products. In the invention disclosed herein the processing temperature for the microwave assisted pyrolysis may be low, i.e. between 100 and 300° C. Additionally, the biomass may be fed into the microwave chamber through a narrow feed tube with one or more outlets for gas (FIG. 1) and liquid decomposition (FIG. 1) products. The outlets are placed at the point at which the decomposition reaction occurs enabling immediate removal of products from the microwave chamber thus preventing prolonged heating and exposure to microwaves.

A number of biomass microwave processor designs are reported in the patent literature. For example, U.S. Pat. No. 4,795,300 describes a processor where microwaves are used to dry the biomass prior to pyrolysis, but the pyrolysis itself is initiated with a powerful laser and occurs at temperatures in excess of 400° C. The process utilises a screw feed or an auger to mix and propel the materials through the process. Use of this material conveying method for biomass is the most popular in the existing designs. International Patent application No. WO 2006/057563 utilises an auger screw to transport materials and mix them to ensure even irradiation with microwaves which are irradiating the chamber from one side. A similar design is reported in US Patent application No. 2008/0063578 which describes generation of carbonaceous materials. In addition to mixing and propagation of the feed materials and products, an auger may enable contact heating of the material to be processed, as described in Canadian Patent No. 2,577,684.

An alternative method of feeding materials into and through the microwave chamber involves conveyor belts. U.S. Pat. Nos. 5,330,623 and 3,843,457 both employ a conveyor belt to transport organic materials through a microwave chamber. However these systems do not allow easy mixing of the material which might be unevenly irradiated. U.S. Pat. No. 4,631,380 discloses a design for sterilisation of grain whereby a number of microwave sources are arranged across and around a central cylindrical passage way thus irradiating the material evenly as it passes through. The material can be conveyed by an auger or a belt conveyor and the passage way is constructed using a microwave transparent material.

An alternative approach is proposed in International WO 2007/007068 whereby the whole chamber is rotated around its axis much like in a tumble dryer. The material is mixed and irradiated with microwaves through the chamber. This design is also equipped with vents in the inner wall of the chamber for venting gasses and the rotating action prevents the material from falling through these vents.

Open chambers or vents are used to enable the removal of pyrolysis vapours. However, the microwave processing chambers in these existing designs are typically large, leaving significant void spaces where vapours and/or residues can collect and continue to be heated and/or reacted. The vapours can react with themselves or the feedstock and condense on the walls of the chamber where they can further react to form heavier fractions such as tars. The deposits can potentially block microwave radiation windows/inlets affecting the irradiation of samples. Even with a flow of carrier gas or a vacuum, which is commonly employed, a large void volume is a disadvantage in that it allows secondary reaction after pyrolysis or torrefaction. Furthermore, larger microwave chambers will require larger amounts of inert gases and/or more powerful vacuum to (1) ensure the necessary anaerobic conditions are maintained throughout the pyrolysis/torrefaction reactions; and (2) ensure that the vapours are removed from the chamber.

Furthermore, fractionation of pyrolysis/torrefaction products according to the residence time of materials in the microwave is disclosed as part of the present invention. The system described herein enables fractionation of the liquid and gaseous products obtained from the degradation process. It may be controlled by altering outlet positioning, rate of feed, microwave power and/or positioning. This is a key advantage of the present invention over existing processors.

A similar principle can be utilised for additives which can be injected into the processor at different points to affect desired reactions. This may additionally enhance the flexibility and control of the process.

The present invention overcomes these disadvantages having a material carrier tube which is transparent to microwaves and closely surrounds the biomass material so as to reduce voids. Careful positioning of the outlet ports on the processor can help to remove gaseous, vaporous or liquid products as soon as they are formed. Additionally because of the close fit of the feed in the processor any char deposited on the inner walls of the processor can be wiped off/cleaned by the forward moving materials ensuring that the enclosure remains transparent to microwaves. Additionally, none of the prior known designs take advantage of the densification of biomass to maximise the absorption efficiency of the microwave energy nor the preheating generated through that process.

Densification of biomass can be achieved in a number of ways, for example: pelletising, briquetting or screw extrusion. A combination of screw extrusion and microwave irradiation is known and has been applied in food processing (DE3237267: Process for extruding a foodstuff with the use of microwaves) and extrusion of plastics and rubber articles (U.S. Pat. No. 1,493,836: Extrusion Process). However, it has only been used to warm or melt materials, but it has not been applied in preheating and/or pyrolysis/torrefaction of biomass.

European Patent Application No. 1978086 discloses a process for the production of biogas or bioethanol from water and lignocellulosic biomass in which an extruder is used to premix powdered lignocellulosic material and water to form a paste for microwaving, but this process involves hydrolysis and not pyrolysis/torrefaction of biomass and additionally does not benefit from densification and temperature increase, but merely from improved mixing between components.

SUMMARY OF THE INVENTION

Thus, according to a first aspect of the invention we provide a processor for use in the microwave torrefaction of biomass material which comprises;
(1) a material densifier, optionally including means for preheating the biomass material; and
(2) a microwave unit adapted to conduct microwave-assisted torrefaction of the biomass material, the unit comprising a feed pipe for material transfer fitted with gas and/or liquid outlets to enable rapid removal of gas and/or liquid formed during the process.

The biomass may be pulverised and dried before feeding to the densifier. The drying can optionally be conducted with heat generated by the microwave process utilising a heat exchanger described herein. Pulverisation should be carried out by equipment suitable for the biomass to be processed. Typically a hammer mill or chopper used in standard biomass densification technologies can be used although other appropriate means can also be employed.

The pulverised material is then fed into a material densifier. The material densifier may be, for example, a pelletiser, a briquetter, a screw extruder, etc. Thus, the material densifier may be known to the person skilled in the art. The object of the densifier is to increase the density of the biomass material which makes the process more efficient. It also enables the biomass material to be preheated to the desired processing temperature. The densifier can be a standard commercially available pelletiser, or a briquetter but is preferably one capable of producing continuous rods which can be fed into the microwave chamber. Screw type extruders capable of continually feeding material are also appropriate and preferred. If appropriate liquid additives, such as, but not limited to those used in typical densification processes, e.g. glycerol or waste glycerol, or others, such as, ammonia, hydrochloric or sulphuric acid, etc., can be mixed in to help material processing into a dense rod. The density of the extruded material that can typically be achieved by commercial processors, but typically, not essentially, higher densities (in excess of 600 kg/m$^3$ are preferred). The densifier should be preferably, but not essentially, equipped with means of temperature and processing rate control, to allow flexibility and control of the system and to allow for variability in the feed material. The material should normally be preheated during mechanical processing but, where additional heating is necessary, auxiliary heating can be supplied by a heat exchanger, which removes heat from the sample after the microwaving stage. The preheating temperature should be between 100 and 300° C., preferably 120-250° C., more preferably 160-220° C. and most preferably 180-200° C. Optionally, the densifier can be fitted with an outlet for exhaust gasses and/or liquids generated in the pressing processes.

Additionally, the densifier should be fitted with a gas inlet near the point the densified material is fed into the microwave chamber for feeding gases which suppress flame formation and/or assist removal of vapours, gasses and liquids generated in the microwave assisted degradation process. These can include, but are not limited to, for example, nitrogen, hydrogen, carbon dioxide, acidic or basic vapours or other additives which can help to catalyse certain processes.

The compressed feed material together with the gas may be fed directly into a carrier tube which feeds into and runs through the microwave chamber. If the biomass material is prepared in short pellets, rather than a continuous feed, a means of propulsion should be integrated into the densifier to ensure feeding and continuous passage of the material through the carrier tube whilst overcoming friction between the carrier tube and the densified material. The carrier tube feeds material directly into and through the microwave chamber and takes the bio-char out at the end of the degradation process.

The carrier tube should be constructed of a strong material, which is transparent to microwaves, heat resistant to at least 300° C. and capable of withstanding mechanical pressure of the feed materials as along with the pressure of the evolved gasses during the process. It should also have low friction to allow smooth transfer of material within close contact to the sides. Construction materials can, for example, include glass, toughened or Pyrex® glass, or other suitable non-metallic material. The choice of a suitable construction material can allow online monitoring such as, but not limited to, NIR probes, laser probes or UV-Vis measurements, which can aid control of the process.

Although the tube may be any conventional shape, it is desirably substantially cylindrical with a substantially uniform diameter throughout. It will be understood that the diameter of the tube may be governed by, inter alia, the size of the extruded/pressed biomass material and its density as well as the penetration ability of microwaves which depend on wave parameters and power. Thus, the tube diameter may typically be less than 50 cm to ensure that the biomass sample is irradiated uniformly throughout and sizes of about 0.5-10 cm in diameter are most preferable. It is also desirable that the tube or chamber is dimensions to correspond to the amount of biochar being processed. Thus, the chamber closely surrounds the biomass material so as to reduce the size of any void(s) remaining and therefore reduce the undesirable reactions that can be a consequence of excessive voids. The carrier tube may comprise an irregular shape, for example, a tube with a conical shape, e.g. with a progressively smaller diameter following the degradation reaction to account for the resulting mass loss, may be desirable. The exact specification of the reduction in size will depend upon, inter alia, the reaction conditions employed, biomass used and the pre-treatment employed. Similarly the length of the tube will depend upon, inter aha, process parameters, including the diameter of feed material, the rate of feed, microwave power, number of microwave irradiation points used, etc.

The pressed material is fed into the microwave chamber. The use of the microwave processor to conduct microwave-assisted torrefaction of the material is so as to yield a higher calorific value char, decomposition oils and/or gasses. The chamber should be fitted with at least one microwave irradiation source, if more than one irradiation source is used they can optionally be shielded from each other to allow better control of the reaction. A simple low power microwave source is typically required as reactions are very rapid. Typically a 15 mm biomass cylinder can be charred in around 10 seconds at 300 W power input, a larger volume of, for example 35 mm can take around 200 seconds, but this relationship is not linear. Higher power microwave generators, or more sequenced generators might be required for high throughput rates. The process conditions can easily be controlled by altering the feed rate from the densifier. The microwave irradiation can be focused around the carrier tube or reflected around the chamber. The microwave source should be located in any geometry which is perpendicular or angled along the carrier tube in some cases use of reflective mirrors might be beneficial to ensure uniform sample irradiation.

Inside the chamber the carrier tube is desirably fitted with exhaust tubes to enable the removal of degradation vapours and liquids placed preferably adjacent the top and/or bottom of the tube respectively. The removal of volatile or liquid products will be promoted by the mixed gas (e.g. nitrogen) and/or can be assisted by vacuum. The exact positioning of the outlet tubes will depend on process parameters, but flexibility is built into the process through control of the feed rate, density, microwave power and other aspects to enable optimisation. Typically the one or more outlets will be placed in direct proximity to the area where pyrolysis/torrefaction occurs. The one or more outlets can be angled relative to the flow of the material in the tube to minimise particulate matter entering the outlet holes. Additionally, the one or more outlets can be fitted with traps for any particulate or early condensing matter and/or appropriate filters. The length of the outlet tubes within the microwave chamber should be kept to a minimum to ensure material is removed from the degradation environment as soon as possible to avoid secondary reactions, unless these are particularly required by the application. Once outside the chamber, the volatile and/or liquid products can be treated in conventional ways.

Significantly, this design has sufficient flexibility built in to enable fractionation of the degradation products. Thus, a number of outlets can be used to facilitate the process and can be spaced according to the progress of reaction(s) along the carrier tube. This can be used in conjunction with sequential microwave sources to allow for better process control. For example, at an early stage water vapour can be removed followed by more organic fractions and chars. Fractionation of the degradation products is an important and innovative aspect of the present invention. It enables users to take full advantage of the low temperature employed in the process to preserve chemical functionality and offers an opportunity for the users to maximise the value of their chemical products resulting from the degradation.

At the end of the pyrolysis/torrefaction the remaining bio-chars can be removed from the microwave chamber into a cooling area. At the end of the microwave process the bio-char can reach temperatures in excess of 300° C., to avoid potential for fires the bio-char must be cooled. At this stage, optionally, a heat exchanger can be used whereby the heat dissipated from the char can be transferred to drying and/or preheating the feed material in the pulverisation and/or densification stage. Use of a heat exchanger can significantly improve the energy footprint of the process. Additionally, other elements of the process should preferably be insulated to avoid loss of valuable heat energy.

We also provide a process for the microwave torrefaction of biomass material which comprises the steps of;
(1) densifying the material;
(2) optionally preheating the biomass material;
(3) torrefying the material in a microwave processor; and
(4) collecting gas and/or liquid formed during the process.

The process takes advantage of densification and heat pre-treatment, both of which are important in efficient microwaving of biomass.

The process allows flexibility and control to accommodate a variety of samples such as, but not limited to biomass.

In the process, the biomass may be pulverised and dried. Pulverisation should be carried out by equipment suitable for the biomass to be processed. Typically a hammer mill or chopper used in standard biomass densification technologies can be used although other appropriate means can also be employed. The drying can optionally be conducted with heat generated by the microwave process.

Liquid additives, such as, but not limited to those used in typical densification processes, e.g. glycerol or waste glycerol, can be mixed in to help material processing into a dense rod.

When the process includes the optional pre-heating step, the pre-heating temperature may be from 100 to 300° C., preferably 120-250° C., more preferably 160-220° C. and most preferably 180-200° C.

The process conditions can easily be controlled by altering the feed rate of the biomass from the densifier. The microwave irradiation can be focused around the carrier tube or reflected around the chamber.

The vaporous and liquid products of the process may be treated in conventional ways. In addition, the degradation products may themselves be fractionated as part of the process of the present invention. For example at an early stage water vapour can be removed followed by more organic fractions and chars. Fractionation of the degradation products is an important and innovative aspect of this invention. It enables users to take full advantage of the low temperature employed in the process to preserve chemical functionality and offers an opportunity for the users to maximise the value of their chemical products resulting from the degradation.

Thus, according to one aspect of the invention we provide a method of producing L-glucosan which comprises the microwave torrefaction of a biomass material in the presence of ammonia or hydrochloric acid (HCl).

We especially provide a method of producing L-glucosan in which ammonia is used. When ammonia is included in the reaction, the amount of ammonia present in the reaction of the invention may vary depending upon, inter alia, the nature of the biomass, the temperature of the torrefaction, etc. However, desirably, the amount of ammonia should be 5% or less based on the weight of the biomass, e.g. from 0.2 to 5% w/w or from 1 to 3% w/w. Ammonia could be introduced to biomass either from dry gas phase or from solution.

In the production of L-glucosan when HCl is included in the reaction instead of ammonia, the amount of acid present in the reaction of the invention may vary depending upon, inter alia, the nature of the biomass, the nature of the acid, the temperature of the torrefaction, etc. However, desirably the amount of acid should be low than 30%, preferably less than 5% based on the weight of the biomass, e.g. from 0.5 to 5% w/w or from 1 to 3% w/w.

In the production of L-glucosan the nature of the acid may also vary, although preferred acids are those acids that are readily available in large scale and commodities, such as hydrochloric or sulphuric acid. The nature of the acid has been shown to have an influence on the product of microwave torrefaction. For example, hydrochloric acid increases the amount of oil and the yield of L-glucosan despite the fact that sulphuric acid decreases the amount of oil, significantly increases yield of L-glucosenone and does not significantly change L-glucosan yield.

HCl could be introduced either from dry hydrochloric acid in a gas phase or from solution. The concentration of acid should be lower than 100% w/w, preferably ≤30% w/w, more preferably ≤10% w/w and especially ≤5% w/w. In the process of the invention the use of 5% or less of ammonia produces L-glucosan as a major component of the oils production from microwave torrefaction. The amount of L-glucosan in the oil may be as much as 50% and thus the bio-oil is significantly simplified.

The production of L-glucosan is especially advantageous since it has been shown that L-glucosan may be enzymatically digested to glucose and consequently may be useful in the production of biofuels, such as bioethanol. Thus, in a further aspect of the invention we provide a process for the manufacture of glucose, suitable for the bioethanol production, which comprises:
  (i) microwave torrefaction of a biomass material to in the presence of ammonia or HCl to produce L-glucosan; and
  (ii) hydrolysis of the L-glucosan of step (i) to produce glucose.

We have further found that the addition of sulphuric acid dramatically decreases the yield of organic oil, but, importantly, simultaneously produces a significant increase in the char yield. Therefore, the use of sulphuric acid may have the ability to dramatically reduce the amount of waste in bio-char production. Sulphuric acid may desirably be introduced from solution, for example, sulphuric acid could be adsorbed from an aqueous solution.

Thus, according to further aspect of the invention we provide a method of producing bio-char which comprises the microwave torrefaction of a biomass material in the presence of sulphuric acid.

We have found that the presence of an acid, such as sulphuric acid, increases the yield of solid, i.e. char, product greatly (see FIG. 34A). For example, in the presence of 3% of sulphuric acid, we have found that char yield is 50% higher than the yield of char under standard conditions, i.e. microwave torrefaction in the absence of sulphuric acid. Furthermore, the calorific value of the char produced by microwave torrefaction is increased in the presence of acid/base additives by up to 50%.

The amount of sulphuric acid present in the reaction of this aspect of the invention may vary depending upon, inter alia, the nature of the biomass, the nature of the acid, the temperature of the torrefaction, etc. However, desirably the amount of acid should be 5% or less based on the weight of the biomass, e.g. from 0.5 to 5% w/w or from 1 to 3% w/w.

Although it is often considered desirable to maximise the amount of oil produced, in certain circumstances a decreased oil yield is preferred. For example, in the operation of furnaces, e.g. in power generation, oil is generally considered a waste product and it is the char that is the desired product. Thus, the fact that the use of sulphuric acid as hereinbefore described may reduce the amount of oil produced may be seen as significantly beneficial in the generation of power from biomass/char.

However, this contrasts with the use of hydrochloric acid insofar as, whilst hydrochloric also increases the yield of bio-char, it also increases the yield of organic oil simultaneously with an increase in the char yield.

Thus, according to further aspect of the invention we provide a method of producing bio-char which comprises the microwave torrefaction of a biomass material in the presence of hydrochloric acid.

The bio-char may comprise one or more of a lignocellulosic char, a cellulosic char or a hemicellulosic char and mixtures thereof.

In this aspect of the invention the method comprises a method of producing bio-char and bio-oil.

We have also found that the use of amines other than ammonia, for example, trialkylamines, such as tri-n-butylamine increase the wax produced from wheat straw.

Thus, according to a yet further aspect of the invention we provide a method of producing a bio-wax which comprises the microwave torrefaction of a biomass material in the presence of a trialkylamine.

Microwave irradiation is defined as "electromagnetic irradiation in the frequency range of 0.3 to 300 GHz". Similar to domestic microwaves, specialised chemistry microwave reactors operate at 2.45 GHz. Microwave radiation is used in several applications including radar, communications, radiometry, medicine, physics, chemistry, and cooking food. Compared to conventional heating techniques a microwave process is advantageous in terms of shorter reaction times, higher heating efficiencies and greater control. The advantages of microwave technology in terms of mobility of small scale processors and value in waste reduction applications have been highlighted by Ruan et el.[7] The use of microwaves is well established in many industrial and commercial applications. Microwave treatment of biomass is used before and or during extraction processes. The use of microwave for extraction of oil is gaining significantly in terms of commercial importance and wide spread utilization. It is employed in extraction of primary plant oils as well as extraction of petroleum oils from drilling muds, tar sands. Microwave ovens have gained acceptance as a mild and controllable processing tool. Microwaves allow simple, rapid and low solvent consuming processes. Microwaves are already widely used for extraction of oil from solid to liquid (CEM-2005). The use of microwaves is also growing in the processing of materials. Microwave processing is now being used for "the production of advanced ceramics, the deposition of thermal barrier coatings, and the remediation of hazardous wastes" with new applications constantly being researched.

[7] M. Miura, H. Kaga, T. Yoshida, K. Ando "Microwave pyrolysis of cellulosic materials for the production on anhydrosugars" J. Wood. Sci. 2001, 47, 502-506.

Low temperature pyrolysis, also known as torrefaction, is a thermal treatment usually carried out between 200 and 300° C. Torrefaction is a mild biomass pre-treatment process for upgrading the quality of biomass as fuel for combustion and gasification applications. Torrefaction can also be referred to as roasting, slow and mild pyrolysis and high temperature drying. Thus, by the term "microwave torrefaction" we mean a mild pyrolysis carried out in the presence of microwave irradiation, and in particular a treatment process carried out at a temperature of between 100 and 300° C., for a variety of biomass materials. Particular temperature ranges may be used depending upon, inter alia, the nature of the biomass, thus ranges which may be suitable are preferably between 100-220° C. for hemicellulose and hemicellulose rich biomass, 200-300° C. for cellulose and cellulose rich biomass, and above 250° C. for lignin and lignin rich biomass.

Conventional (non-microwave) torrefaction of biomass materials such as wood is well known. Torrefied wood has the moisture and most volatile organic compounds (VOC's) driven out resulting in a high percentage of carbon content. In addition, the chemistry and structure of the wood itself is converted into a new form by continued exposure to heat. Torrefaction of other biomass of materials, such as plant origin, e.g. prunings and/or mown grass, or waste materials is also known.[8] However, the micronisation or pulverisation of such torrefied materials has proved unsatisfactory.

[8] A. M. Sarotti, R. A. Spanevello and A. G. Suarez "An efficient microwave-assisted green transformation of cellulose into levoglucosenone. Advantages of the use of an experimental design approach" Green Chemistry, 2007, 1137-1140.

The biomass used in the present invention may comprise untreated biomass, pre-treated biomass, biomass fractions, and components and mixtures thereof.

The bio-char will generally be a lignocellulosic char material and it is advantageous in that, inter alia, it is suitable as a fuel, for example, in the generation of power. Therefore, advantageously the bio-char of the invention may be mixed with other fuels, such as coal. Therefore, according to a further aspect we provide a fuel comprising a bio-char material according to the invention. We further provide a fuel as hereinbefore described which comprises the bio-char material in admixture with other conventionally known fuels, such as a polysaccharide or coal (e.g. pulverised coal).

The process of the present invention is especially advantageous in that by the use of relatively low temperatures and control of the power input, inter alia, it provides the torrefaction of naturally occurring products in a biomass, such as cellulose, hemi-cellulose and/or lignin.

Therefore, according to a further aspect of the invention we provide a method as hereinbefore described of selective microwave torrefaction of hemicellulose from a biomass between 100-200° C.

Furthermore, we provide a method as hereinbefore described of microwave torrefaction for the production of breakdown products of cellulose, between 200-250° C.

Furthermore again, we provide a method as hereinbefore described of microwave torrefaction for the production of breakdown products of lignin, above 250° C. in the presence of ammonia. The amount of ammonia should be 5% or less based on the weight of the biomass, e.g. from 0.5 to 5% w/w or from 1 to 3% w/w.

According to a further aspect of the invention we provide a method as hereinbefore described in which the irradiation power is between 100 and 1200 W when using a CEM Discover™ (available from CEM Microwave Technology Ltd. Buckingham, UK) and Millstone Microwave. As is well known in microwave processing the power input depends on the size of the microwave cavity and the cavity geometry, therefore, it would be understood by the person skilled in the art that scale-up of the process will include irradiation powers >1200 W.

In the methods of the invention any conventionally known biomass materials may be used, such as waste material, or biomass material grown from plants, including, corn, hemp, miscanthus sugarcane and switch grass, etc., wood, such as poplar or willow, fungal species and marine resources, such as algae.

The method also discloses the use of other additives. Such additives may comprise one or more microwave absorbers, which not only act to absorb the microwave energy but can be used at higher ratios as activators for earlier or alternative decomposition pathways. Although a variety of conventionally known microwave absorbers may be used a preferred microwave absorber is a carboniferous absorber, such as graphite. The catalytic role of the absorber is important. It is well known that graphite and such materials act as absorbers of microwave energy, but we have surprisingly found that at higher ratios (up to 10% graphite/absorber) it is possible to change the properties of the products produced, in a manner contrary to that reported previously, in particular, increased char yields.

The amount of microwave absorber used may also vary, although generally small amounts are necessary. Thus for example the ratio of absorber: biomass may be 1:99 to 10:90. Use of char/graphite differs from those previously reported in that rather than increasing the amount of oil it improves the yield of char and thus can be used to affect the distribution of the three products in a different way.

Alternatively, an additive may comprise a humectant, such as glycerol, glycerine or other such materials, to help extract primary oil, minimize acidity of secondary oil, catalyse the transformation of the biomass and improve properties of secondary oil.

The invention will now be described by way of example only and with reference to the accompanying figures.

Table 3.1 shows that the yield of char depends on the nature of feedstock and additives. The change in yield of char and oil in comparison to those produced under the same conditions in the absence of additives are shown in FIG. 34A. All of the additives increase yield of solid product greatly (FIG. 34A). In the presence of 3% of sulphuric acid char yield is 50% higher than the yield of char in the standard experiment. Calorific value of the microwave produced char is increased in the presence of acid/base additives up to 50%.

The temperature at which the oil is released from the biomass in the presence of additives is lower than the temperature at which it is released in the control microwave experiment (see Table 3.1). As shown in FIG. 34B, the organic oil yield depends heavily on the nature of the additives. For example, addition of hydrochloric acid to wheat straw increases oil yield by 5% (from 21.1 up to 22.1). In contrast, addition of sulphuric acid dramatically decreases oil yield from 21.1% down to 7.3%.

Composition of the organic oils produced in the presence of microwave irradiation (see FIGS. 36 to 39 and Tables 3.2 to 3.5) is different from composition of oil produced during the fast pyrolysis (see FIG. 40). As an agricultural residue, wheat straw is high in the main plant nutrients, especially potassium.[3] Potassium is a well-known catalytic metal for the pyrolysis process, and the product distribution is typical for a catalysed decomposition of the lignocellulose via an ionic mechanism.[4] Thus, low yields of sugars and high yields of furfural and acetic acids are observed from cellulose and hemicellulose decomposition (see FIG. 7).[5] A mixture of phenols and methoxyphenols is produced from decomposition of the lignin component of the biomass.[6] FIG. 36 and Table 3.2 display the GC-MS of the oil produced in the process of microwave torrefaction from wheat straw (control experiment). While catalysed decomposition product markers (furfural and acetic acid) are observed in the microwave oil, the product distribution contains higher relative yields of phenols, methoxyphenols, diphenols and di-methoxyphenols, and high relative yields of the primary cellulose decomposition products (28% of L-glucosan and 1.3% of 1,4:3,6-dianhydro-α-D-glucopyranose), possibly due to the milder temperatures experienced in this case. Thus, qualitatively, it appears that the bio-oil produced in the process of microwave torrefaction has a higher relative yield of aromatics and primary sugars compared to the fast pyrolysis oil. M. Miura et al proved that microwave heating of cellulose and wood increased L-glucosan yield.[7] Also, A. M. Sarotti et al have demonstrated that cellulose can be pyrolysed under microwave irradiation to produce L-glucosenone.[8] Neither of these teams has done any investigation of acid/base influence on the L-glucosan and L-glucosenone yields.

The influence of acid additives on the composition of microwaved oil is shown in FIGS. 37 and 38 and Tables 3.3 and 3.4. Bases increase the relative concentration of sugar derivatives in the bio-oil in comparison with a control microwave experiment. Microwave torrefaction of biomass in the presence of $H_2SO_4$ gives a narrower range of products, predominately sugar derivatives, such as L-glucosenone, in the bio-oil. The high concentration of L-glucosenone could be explained because it is well known that acid catalysed rearrangement/dehydration of cellulose during the pyrolysis.[9,10] It can be seen that the yield of sugars is increased in the presence of hydrochloric acid from 29.3% to 41% in comparison with control microwave experiment. In contrast to sulphuric acid, concentration of L-glucosenone in the oil is insignificant (1.5%). A major component in this case is L-glucosan (35.5%). The effect of ammonia on the composition of the oil is shown in FIG. 39 and Table 3.5. L-glucosan (46%) and 2,3-dihydro-benzofurane (10.2%) are two major components of this oil.

[9] Nowakowski D. J., Woodbridge C. R., Jones J. M., Phosphorus catalysis in the pyrolysis behaviour of biomass. J. Anal. Appl. Pyrol. 83 (2008) 197-204.
[10] Di Blasi C., Branca C., Galgano A., Thermal and Catalytic decomposition of wood impregnated with sulfur- and phosphorus-containing ammonium salts. Polymer Degrad. Stabil. 93 (2008) 335-346.

It is significant that during the microwave-low-temperature torrefaction chem-adsorbed water, accompanied by low molecular mass acids/bases, is released separately from the organic oil. As a result, neither additives influence water content nor the acid number of the organic oil obtained during the microwave experiment. In the typical low temperature microwave experiment the water content is lower than 1% of the oil mass and the acid number is lower than 10. These parameters are much better than those for the typical fast pyrolysis oil[11] and the oil obtained at the high temperature microwave pyrolysis[12].

[11] Report 40661. The Exploitation of Pyrolysis Oil in the Refinery Main Report. Prepared For: The Carbon Trust. March 2008.
[12] Yu F., Deng S., Chen P, LIU Y., Wan Y., Olson A., Kittelson D., and Ruan R. "Physical and Chemical Properties of Bio-Oils. From Microwave Pyrolysis of Corn Stover", Applied Biochemistry and Biotechnology, 2007, 136-140, pp 957-950.

In a further aspect of the present invention it is demonstrated that the effects of microwave irradiation on the decomposition of each of the major constituent components: cellulose, hemi-celluloses and lignin. The invention also demonstrates that this process of decomposition in the presence of microwave irradiation can be successfully carried out at temperatures lower than those used in conventional conditions and in the presence or absence of additives as hereinbefore described. As a result of the alternative production method it is possible to prepare new materials with novel properties, such as high calorific value char and previously unreported yields of oils with controllable properties. Furthermore, the lignocellulosic char produced is advantageous in that, inter alia, it may be micronised or pulverised which renders it more suitable as a fuel. We also demonstrate that the control of, inter alia, irradiation power and temperature have independent effects on the product distribution and product properties.

Therefore, according to a further aspect of the invention we provide a micronised biomass char material. The biomass char material is suitably derived from a lignocellulosic biomass material using processes hereinafter described. By the term micronised we mean generally comminuted or pulverised char material. Thus, the particle size of the micronised biomass material, e.g. a lignocellulosic char material, may be from 10 to 1,000 μm, preferably from 10 to 500 μm, more preferably from 10 to 250 μm and more preferably from 10 to 100 μm. It should be understood that the present invention contemplates the preparation of a lignocellulosic char material which is suitable for micronisation.

As hereinbefore described, the micronised lignocellulosic char material is advantageous in that, inter alia, it is suitable as a fuel, for example, in the generation of power. Therefore, advantageously the micronised char of the invention may be mixed with other fuels, such as coal. Therefore, according to a further aspect we provide a fuel comprising a micronised lignocellulosic char material according to the invention. We further provide a fuel as hereinbefore described which comprises the micronised lignocellulosic char material in admixture with other conventionally known fuels, including one or more of cellulosic char, hemicellulosic char, polysaccharide and coal (e.g. pulverised coal).

According to a yet further aspect of the invention we provide a method of producing a micronised biomass char material which comprises the steps of;
(i) microwave torrefaction of a biomass material to produce a char; and
(ii) micronising the char of step (i).

The process particularly provides a method of producing a micronised lignocellulosic biomass char material. In addition, we provide a method of producing a lignocellulosic char material which comprises of microwave torrefaction of the biomass.

By the term "microwave torrefaction" we mean a mild pyrolysis carried out in the presence of microwave irradiation, and in particular a treatment process carried out at a temperature between 100 and 300° C., for a variety of biomass. In particular preferably between 100 and 220° C. for hemicellulose and hemicellulose rich biomass, 200 and 300° C. for cellulose and cellulose rich biomass, and above 250° C. for lignin and lignin rich biomass.

The process of this aspect of the present invention is especially advantageous in that by the use of relatively low temperatures and control of the power input, inter alia, it provides the torrefaction of naturally occurring products in a biomass, such as cellulose, hemi-cellulose and/or lignin.

Therefore, according to a further aspect of the invention we provide a method of selective microwave torrefaction of hemicellulose from a biomass between 100 and 200° C.

Furthermore, we provide a method of microwave torrefaction for the production of breakdown products of cellulose, between 200 and 250° C.

Furthermore, we provide a method of microwave torrefaction for the production of breakdown products of lignin, above 250° C.

The present disclosure demonstrates that the decompositions for hemicelluloses and cellulose can be lower by up to 150° C. compared to thermal methods by employing the disclosed microwave method. This means that the microwave induced torrefaction disclosed in the present invention can now extend to include cellulose decomposition at temperatures below 300° C. and can yield decomposition oil resulting not only from decomposition of hemi-cellulose but also cellulose.

The present disclosure also offers energy savings over conventional torrefaction methods due to the notable energy efficiency of microwave technology and minimum energy losses during the condensation of the biomass energy in char, oil and gas.

The disclosed method enables the decomposition of biomass components: cellulose and hemi-cellulose in biomass mixture or individually at temperatures at least 100° C. lower than in conventional thermal pyrolysis methods.

Therefore, according to a further aspect of the invention we provide a method as hereinbefore described in which the temperature selectively affects the different components. Thus, from 100 to 220° C. predominantly provides hemicellulose decomposition; from 200 to 300° C. predominantly provides cellulose decomposition; and >250° C. predominantly provides lignin decomposition.

According to a further aspect of the invention we provide a method as hereinbefore described in which the irradiation power is between 100 and 300 W when using a CEM Discover™ (available from CEM Microwave Technology Ltd. Buckingham, UK). As is well known in microwave processing the power input depends on the size of the microwave cavity and the cavity geometry, therefore, it would be understood by the person skilled in the art that scale-up of the process will include irradiation powers >300 W.

The process of the present invention is also advantageous, inter alia, because it yields char and/or oil with calorific values at least 10% higher than obtainable by conventional pyrolysis methods and known microwave pyrolysis methods. The yield of oil has also been found to be greater when compared to known methods under similar conditions.

The calorific values of torrefaction oils reported in the present invention are up to 19 kJ/g. Char obtained by the method of the present invention, and especially the micronised char of the invention, has a calorific value of up to 32 kJ/g, which is higher than char produced by conventional methods or as reported in high temperature microwave methods. Importantly, this value is comparable to that obtained from coals (27 to 32 kJ/g).

Therefore, according to a further aspect of the invention we provide a method of manufacturing a high calorific value char which comprises microwave torrefaction of a biomass optionally in the presence of hydrochloric acid as hereinbefore described and optionally followed by micronisation of the char. It will be understood that bio-char suitable for, inter alia, micronisation may be manufactured according to the method of the present invention without the use of additives, such as hydrochloric acid.

We also provide a torrefied biomass char which can be easily micronised wherein the char has a calorific value from 20 to 32 kJ/g.

Furthermore, we provide a torrefied biomass char which is suitable for grinding and/or micronisation prior use for energy production.

By the term "high calorific char" we mean a char that has a calorific value comparable to coal. We especially provide a method of manufacturing a high calorific value char which comprises microwave torrefaction of cellulose optionally in the presence of hydrochloric acid. Alternatively, we provide a method of manufacturing a high calorific value char which comprises microwave torrefaction of hemi-cellulose. In a further alternative, we provide a method of manufacturing a high calorific value char which comprises microwave torrefaction of lignin.

Furthermore, the microwave torrefaction of individual biomass components using the disclosed procedure also yields higher values than obtainable with conventional methods. Values up to 45 kJ/g were obtained for hemi-cellulose pyrolysed by the disclosed method compared to 39 kJ/g for conventional pyrolysis. For cellulose the maximum values attained were 34 compared to 30 kJ/g for the disclosed microwave and conventional methods respectively. The calorific values of other biomass samples can similarly be maximised to a similar extend with the individual components giving proportional contributions to the overall calorific value of whole biomass.

Furthermore, the microwave torrefaction of biomass which is not rich in hemicellulose, cellulose and lignin, such as algae and biomass rich in other polysaccharides, also yields chars of high calorific value.

Therefore, we also provide a torrefied cellulose char wherein the char has a calorific value of up to 34 kJ/g.

We also provide a torrefied hemi-cellulose char wherein the char has a calorific value of up to 45 kJ/g.

We also provide a torrefied biomass derived oil with a calorific value up to 20 kJ/g, and a gas which may also be used for energy production.

The use of microwave radiation to produce a char and oil from cellulosic material as hereinbefore described is also advantageous in that the use of low temperatures, e.g. in 120° C. produces oils with a pH of 3-4. This compares with a pH range of 1-2 when a higher temperature e.g. 150° C. was used.

Thus, according to a yet further alternative aspect of the invention we provide a method of producing an oil from a biomass material without the use of an additive as hereinbefore described, wherein the oil has a pH of from 3 to 4, wherein the method comprises the low temperature microwave torrefaction of a biomass material. The method of this aspect of the invention is especially advantageous in the production of, inter alia, secondary oils.

Furthermore, the use of microwave radiation to produce a char and/or oil from cellulosic material is also advantageous in that the use of low temperatures, e.g. about 120° C., produces oils with a water content of 10% w/w or less. This may be compared with oils with a water content of up to 30% w/w when a higher temperature e.g. 150° C., was used.

Thus, according to a yet further aspect of the invention we provide a method of producing an oil from a biomass material, wherein the oil has a water content of 10% w/w or less, wherein the method comprises the low temperature microwave torrefaction of a biomass material, optionally in the presence of an additive as hereinbefore described. The method of the invention is especially advantageous in the production of secondary oils.

Furthermore, the method enables independent control of temperature and microwave power to selectively affect different components in the biomass and thus control the distribution and/or elemental and/or chemical composition of decomposition products: solids, liquids and gases. Specifically, oils prepared at the same temperature using different powers can be shown to display different properties, and also oils prepared at different temperatures using the same microwave power can be differentiated.

In the method of the invention any conventionally known biomass materials may be used, such as waste material, or biomass material grown from plants, including, corn, hemp, miscanthus sugarcane and switch grass, etc., wood, such as poplar or willow, fungal species and marine resources, such as algae.

The method also discloses the use of additives as hereinbefore described. Such additives may comprise one or more microwave absorbers, which not only act to absorb the microwave energy but can be used at higher ratios as activators for earlier or alternative decomposition pathways. Although a variety of conventionally known microwave absorbers may be used a preferred microwave absorber is a carboniferous absorber, such as graphite. The catalytic role of the absorber is important. It is well known that graphite and such materials act as absorbers of microwave energy, but we have surprisingly found that at higher ratios (up to 10% graphite/absorber) it is possible to change the properties of the products produced, in a manner contrary to that reported previously, in particular, increased char yields.

The amount of microwave absorber used may also vary, although generally small amounts are necessary. Thus for example the ratio of absorber: biomass may be 1:99 to 10:90. Use of char/graphite differs from those previously reported in that rather than increasing the amount of oil it improves the yield of char and thus can be used to affect the distribution of the three products in a different way.

Alternatively, an additive may comprise a humectant, such as glycerol, glycerine or other such materials, to help extract primary oil, minimize acidity of secondary oil, catalyse the transformation of the biomass and improve properties of secondary oil.

The method of the invention is advantageous because, inter alia, we achieve:
  Much higher yields of pyrolysis oils at low temperatures (<300° C.)
  Control of properties of the oil at <350° C. (variable power and temperature)
  Greater degree of chemical functionality of the oils through use of lower temperatures
  Use of graphite to control composition of oil and the oil/char/gas balance
  Use of glycerol (and other additives) to control oil composition and the oil/char/gas balance
  Higher calorific value chars from biomass, and components and fractions thereof
  Highest calorific value chars from cellulose and hemicellulose
  First demonstration of selective activation of cellulose and to a lesser extent hemi-cellulose
  More energy efficient method of biomass processing through use of microwave technology
  Low temperature production of a high calorific value char with physical properties suitable for direct use in energy production.

The biomass used in any of the aspects of the invention may comprise untreated biomass, pre-treated biomass, biomass fractions, and components and mixtures thereof.

The invention will now be described by way of example only and with reference to the accompanying figures, in which;

FIG. 1 is a schematic representation of a microwave processor;

FIG. 2 is a graph illustrating the separation of aqueous and organic fraction based on microwave time;

FIG. 3 is a schematic representation of apparatus set-up for simultaneous microwave-IR experiment;

FIG. 4A) is a Gram-Schmidt trace for isotherm pyrolysis of pelletised biomass and FIG. 4B) is an IR spectrum of the fractions;

FIG. 5 is a graph illustrating the relationship of the specific microwave energy (amount of microwave energy per unit mass which the biomass absorbs) with the degree of densification of wheat straw;

FIG. 6 is a schematic representation of the apparatus set-up for the microwave extraction of volatiles from rape meal;

FIG. 7 is a graph of the microwave profile for the extraction of volatiles from Rape Meal;

FIG. 8A is a Differential Scanning calorimetry analysis of the rape meal oil extract and FIG. 8B a Thermogravimetric analysis of the rape meal extract;

FIG. 9 is a FTIR spectrum of the liquid organic compounds extracted from rape meal;

FIG. 10 is a schematic representation of the apparatus set-up for microwave co-extraction of volatile organic compounds with water from pine wood;

FIG. 11 is a graph of the microwave profile for the extraction of volatiles from pine wood pellets;

FIG. 12 is a FTIR analysis on the volatile extracts from pine wood obtained at the different irradiation power;

FIG. 13 is a graph of the microwave profile of rape meal extracted with n-pentanol;

FIG. 14 is a FUR spectrum of extracts from rape meal with pentanol and water;

FIG. 15 is a schematic representation of the apparatus set-up for microwave extraction of secondary oil from biomass with capture of highly volatile components;

FIG. 16 is a FTIR spectrum of extracts from cellulose, miscanthus, rape meal and Norway spruce;

FIG. 17 is a graph illustrating the calorific value of cellulose chars produced by conventional pyrolysis and microwave irradiation at different temperatures;

FIG. 18 illustrates the direct microwave effect on cellulose;

FIG. 19 is a FTIR of different types of biomass before and after microwave irradiation;

FIG. 20 is a $C^{13}$ NMR of cellulose chars of same elemental composition produced by conventional pyrolysis and microwave irradiation;

FIG. 21 is a graph illustrating the calorific value of hemicellulose chars produced by conventional pyrolysis and microwave irradiation at different temperatures;

FIG. 22 is a graph illustrating the heat of oxidation values for biomass samples before and after MW irradiation;

FIG. 23 is a STA (Simultaneous Thermal Analysis) profile of barley dust mixed with PdO as an oxidant to measure heat of combustion;

FIG. 24 is a STA profile of barley dust after microwave processing;

FIG. 25 is a STA profile of rape meal;

FIG. 26 is a STA profile of rape meal after microwave processing;

FIG. 27 are thermogravimetric IR spectra of volatiles at temperature 330° C. for rape meal before and after microwaving;

FIG. 28 are thermogravimetric IR spectra of volatiles at temperature 390° C. for rape meal before and after microwaving;

FIG. 29 is a graph illustrating the influence of graphite on the product distribution in microwave thermal treatment;

FIG. 30 is a STA profile of pine wood before microwave treatment;

FIG. 31 is a STA profile of pine wood after microwave treatment;

FIG. 32 is a graph illustrating the percentage energy per gram of starting material maintained in the char;

FIG. 33 is a graph illustrating the energy input for microwave torrefaction at 270° C. for different sample masses;

FIG. 34 is a graph illustrating the influence of acid/base additives on the relative change of A) char yield and B) oil yield from wheat straw in microwave torrefaction;

FIG. 35 is a schematic representation of a microwave experiment;

FIG. 36 is a GC-MS trace of wheat straw microwave pyrolysis oil

FIG. 37 is a GC-MS trace of wheat straw microwave pyrolysis oil prepared in the presence of $H_2SO_4$;

FIG. 38 is a GC-MS trace of wheat straw microwave pyrolysis oil prepared in the presence of HCl;

FIG. 39 is a GC-MS trace of wheat straw microwave pyrolysis oil prepared in the presence of ammonia;

FIG. 40 is a GC-MS trace for the fast pyrolysis of wheat straw at 600° C.;

FIG. 41 is Table 2.1 of results from the analysis of sealed up rape char;

FIG. 42 is Table 2.2 of results from the analysis of sealed up rape char—metal impurities; and FIG. 43 is Table 2.3 of particles size distribution.

EXAMPLE 1

Example 1.A

Biomass Processor

The schematic layout of the processor is illustrated as an example in FIG. 1. The biomass is fed at point (1) where, as necessary, it can be pulverised and dried. The drying can optionally be conducted with heat generated by the microwave process utilising a heat exchanged at point (7). Pulverisation should be carried out buy equipment suitable for the biomass to be processed. Typically a hammer mill or chopper used in standard biomass densification technologies can be used although other appropriate means can also be employed.

The pulverised biomass is then fed into a densification chamber (2). This can be a standard commercially available pelletiser, or a briquetter but preferably one capable of producing continuous rods which can be fed into outlet (3). Screw type extruders capable of continually feeding material are also appropriate and preferred. If appropriate liquid additives, such as, but not limited to those used in typical densification processes, e.g. glycerol or waste glycerol, or other known additives, such as, ammonia, hydrochloric or sulphuric acid, etc., can be mixed in to help material processing into a dense rod. The density of the extruded material that can typically be achieved by commercial processors, but typically, not essentially, higher densities (in excess of 600 kg/m3 are preferred). The densifier (2) should be equipped with temperature and processing rate control to allow flexibility and control of the system to allow for variability in the feed material. Optionally it can be fitted with an outlet for exhaust gasses generated in the pressing processes. Additionally the densifier (2) should be fitted with a gas inlet near outlet (3) for feeding gases which suppress flame formation and/or assist removal of vapours, gasses and liquids generated in the microwave assisted degradation process. These can include, but are not limited to nitrogen, hydrogen, carbon dioxide, acidic or basic vapours or other additives which can help to catalyse certain processes. The material should be preheated in the process either through mechanical compression, auxiliary heating (which can be utilised from the heat exchanger at point (7)) or both. The preheating temperature should be between 100 and 300° C., preferably 120-250° C., more preferably 160-220° C. and most preferably 180-200° C.

The compressed feed material together with the gas is fed into outlet (3) into a carrier tube (4). If the material is prepared in short pellets rather than a continuous feed a means of propulsion should be integrated into the densifier (2) to ensure feeding and continuous passage of the material through the carrier tube (4) whilst overcoming friction between the carrier tube and the densified material. The carrier tube (4) feeds material directly into and through the microwave chamber and takes the bio-char out at the end of the degradation process.

The carrier tube should be constructed of a strong material, which is transparent to microwaves, heat resistant to at least 300° C. and capable of withstanding mechanical pressure of the fed materials as along with the pressure of the evolved gasses during the process. It should also have low friction to allow smooth transfer of material within close contact to the sides. Construction materials can for example include glass, toughened or Pyrex glass, or other suitable non-metallic material. Choice of a suitable construction material can allow online monitoring such as, but not limited to, NIR probes, laser probes or UV-Vis. measurements, which can aid control of the process.

The tube (4) can be cylindrical with a uniform diameter throughout. The diameter of the tube will be governed by the size of the extruded/pressed material and its density as well as the penetration ability of microwaves which depend on wave parameters and power. Tube diameter should typically be less than 50 cm to ensure sample is irradiated throughout and sizes of about 0.5-10 cm in diameter are most preferable. The carrier tube can also optionally be irregular in shape having a conical shape with a progressively smaller diameter following the degradation reaction to account for the resulting mass loss. The exact specification of the reduction in size will depend on the reaction conditions employed, biomass used and the pre-treatment employed. Similarly the length of the tube will depend on process parameters, including the diameter of feed material, rate of feed, microwave power, number of microwave irradiation points used and others.

The pressed material is fed into the microwave chamber the chamber should be fitted with at least one microwave irradiation source, if more than one irradiation source is used they can optionally be shielded from each other to allow better control of the reaction. A simple low power microwave source is typically required as reactions are very rapid. Typically a 15 mm biomass cylinder can be charred in around 10 seconds at 300 W power input, larger volume of, for example 35 mm can take around 200 seconds, but this relationship is not linear. Higher power microwave generators, or more sequenced generators might be required for high throughput rates. The process conditions can easily be controlled by altering the feed rate from the densifier. The microwave irradiation can be focused around the carrier tube (4) or reflected around the chamber. The microwave source should be located in any geometry which is perpendicular or angled along the carrier tube (4) in some cases use of reflective mirrors might be beneficial to ensure uniform sample irradiation.

Inside the chamber the carry tube should be fitted with exhaust tubes to enable the removal of degradation vapours (5) and liquids (6) placed preferably on top and bottom of the tube respectively. The removal of volatile or liquid products will be promoted by the mixed gas (e.g. nitrogen) and/or can be assisted by vacuum. The exact positioning of the outlet tubes will depend on process parameters, but flexibility is build into the process through control of feed rate, density, microwave power and other aspects to enable optimisation. Typically the outlets will be placed in direct proximity to the area where pyrolysis occurs. The outlets can be angled along the flow of the material in the tube to minimise particulate matter entering the outlet holes. Additionally these can be fitted with traps for any particulate or early condensing matter and/or appropriate filters. The length of the outlet tubes within the microwave chamber (9) should be kept to the minimum to ensure material is removed from the degrading environment as soon as possible to avoid secondary reactions, unless these are particularly required by the application. Once outside the volatile and liquid products can be treated in conventional ways.

Significantly, this design has sufficient flexibility built in to enable fractionation of the degradation products. A number of outlets can be used to facilitate the process spaced according to the progress of reaction(s) along the carrier tube. This can be used in conjunction with sequential microwave sources to allow for better process control. For example at an early stage water vapour can be removed followed by more organic fractions and chars. Fractionation of the degradation products is an important and innovative aspect of this invention. It enables users to take full advantage of the low temperature employed in the process to preserve chemical functionality and offers an opportunity for the users to maximise the value of their chemical products resulting from the degradation.

Furthermore, in addition to the outlets, the feed pipe may contain inlets for injecting additives such as ammonia or other gaseous, liquid and potentially solid additives, as hereinbefore described, at a controlled point in the process to affect particular reactions.

At the end of the pyrolysis the remaining bio-chars are pushed out of the microwave chamber into a cooling area (7). At the end of the microwave process the bio-char can reach temperatures in excess of 300° C., to avoid potential for fires the bio-char must be cooled. At this stage, optionally, a heat exchanger is used where by the heat dissipated from the char can be transferred to drying and/or preheating the feed material in the pulverisation stage or densification. Use of a heat exchanger can significantly improve the energy footprint of the process. Additionally other elements of the process should preferably be insulated to avoid loss of valuable heat energy.

Example 1.B

Influence of Microwave Time on Cellulose Decomposition Products Under Vacuum

Pyrolysis of cellulose under vacuum was carried out. 50 g of cellulose was preheated at 80° C. and placed inside a Milestone microwave. Microwave irradiation with power 1200 W was applied to the sample during 12 minutes. The typical pressure profile for organic volatiles produced from cellulose under microwave conditions is shown in FIG. 2. As it is indicated in FIG. 2 there are minimum two stages of volatile compounds production: 1) broad low temperature peak around 120° C. and 2) rapid process (narrow peak) at temperature around 180° C. These two fractions were separated by time and analysed. It was shown that the first fraction consists essentially of water which contains acetic and formic acids in combination with formaldehyde and acetaldehyde. This demonstrates that under these conditions (initial preheating temperature below optimum of 180° C.) it is possible to collect two liquid fractions. Firstly, an aqueous fraction is collected with a relatively high acid content at temperatures as low as 60-120° C. and in a period of 3-5 minutes. Thereafter, and by maintaining low temperature control, an organic fraction of low water and low acid content is produced at temperatures around 180° C. within 1-2 minutes. The organic fraction has been collected in yields of up to 21% (water content <1%) from the microwave processing of cellulose. So, simple positioning of outlet tubes, e.g. extraction tubes, along the microwave carrier tube enables the separation of aqueous and organic fractions.

Example 1.0

Influence of Microwave Time on Decomposition of Preheated Biomass Pellets Under Nitrogen Flow Thermal decomposition of canary grass pellets under nitrogen atmosphere was carried out as shown in FIGS. 3 and 4. The apparatus included a microwave and IR gas cell for monitoring off gases.

5 g of canary grass pellets was preheated at 180° C. and placed inside CEM microwave. Microwave irradiation with power 300 W was applied to the sample during 6 minutes. The typical Gram-Schmidt profile (which was calculated as integral of IR gas spectrum) for organic volatiles is shown in FIG. 4. There are at least three stages during the period of microwave decomposition occurring sequentially in time:
1) removal of water with and low boiling aldehydes and acids;
2) removal of $CO_2$ and CO accompanied by organic compounds; and
3) removal of compounds containing hydroxyl groups.

Example 1.D

Influence of Biomass Density on Microwave Decomposition of Biomass

Number of biomass samples with different density were decomposed with microwave thermal treatment to chars. Energy absorbed by the samples was calculated. FIG. 5 shows influence of sample density on the energy efficiency of microwave decomposition.

Example 2.1

Microwave Extraction of Primary Oil & Wax from Rape Meal in Water

The use of microwave radiation and water to extract the primary oil and wax extracts from rape meal was carried out using the following procedure.

Rape meal (4 g) and water (8 g) were weighed out into a round bottom flask with a magnetic stirrer. This mixture was then placed in a laboratory microwave in the open vessel settings. The typical parameters used in the microwave are: power 300 W; time: 1 to 15 minutes; stirring: ON; cooling: OFF.

To the round bottom flask containing the sample mixture a two-necked adapter was attached with one inlet allowing a supply of nitrogen to ensure no oxidation of the materials during the run and the second to allow a Dean-Stark apparatus to be attached with a condenser with cooling set to −10° C. to collect the primary extract. A second condenser with cooling to −60° C. (acetone/liquid nitrogen mixture) was attached, with a two-necked round bottom flask beneath. The complete apparatus set-up is shown in FIG. 6. Primary extracts will mainly originate from extraction in the first $H_2O$ region as shown in FIG. 7 of the microwave profile, a second separate fraction of the primary oil originates from the second $H_2O$ region between 200 and 400 sec and temperature around 120° C.

Example 2.2

Fractionation
Microwave Extraction of Secondary Extracts from the Aqueous Region of Rape Meal Extraction of the secondary extracts for rape meal, which could contain some primary extracts, microwave modified primary extracts and microwave modified solid material that has become extractable from rape meal was conducted using the methodology described in example 1. Secondary extracts will mainly originate from the decomposition regions as shown in FIG. 7 of the microwave profile, temperature above 130° C.

The sample collected in the first condenser was a mixture of water and a yellow oily liquid. The organic layer was separated from water and tested on an STA and FTIR. The main fraction of organic liquid (FIG. 8A) has a melting point ca. −13° C. and a boiling point was ca. 245° C. (FIG. 8B). In FTIR spectra there were peaks which correspond to fatty acids or their derivatives (FIG. 9).

In the second condenser sulphur containing gases and residues were found.

Example 2.3

Influence of Microwave Irradiation Power on Extraction of Secondary Oil from Pine Wood Pellets Extraction of the primary oil and wax extracts from pine wood was carried out as detailed in example 1. The scheme of complete apparatus set-up is shown in FIG. 10. The typical temperature profile for pine wood pellets under microwave conditions is shown in FIG. 11. FTIR analysis can be seen in FIG. 12 of the extracts.

Example 2.4

Microwave Extraction of Primary Oil & Wax from Rape Meal in 1-Pentanol

Extraction of the primary oil and wax extracts from rape meal with 1-pentanol instead of water was carried out as detailed in example 1, with the microwave profile shown in FIG. 13. Comparison of FTIR spectrum of oil samples obtained with 1-pentanol and water, as can be seen in FIG. 14, show difference in nature of the oils obtained.

Example 2.5

Microwave Extraction of Secondary Oil from Rape Meal with Capture of Highly Volatile Components The use of microwave radiation to extract the secondary oil from rape meal was carried out using the following procedure.

Rape meal (4 g) was weighed out into a round bottom flask with an overhead stirrer. This mixture was then placed in a laboratory microwave in the open vessel settings. The typical parameters used in the microwave are: power 300 W; time: 1 to 15 minutes; stirring: ON; cooling: OFF.

To the round bottom flask containing the sample mixture a two-necked adapter was attached with one inlet allowing a supply of nitrogen to ensure no oxidation of the materials during the run and the second to allow a water cooled condenser to be attached with a round bottom flask beneath to collect the extracts. A dichloromethane trap was connected in series with the round bottom flask to capture volatile components, as shown in FIG. 15. FTIR analysis of different oil extracts can be seen in FIG. 16.

Example 2.6

Microwave Extraction of Secondary Oil from *Miscanthus* with Capture of Highly Volatile Components Extraction of the secondary oil from *Miscanthus* was carried out as detailed in example 6. FTIR. analysis of different oil extract fractions can be seen in FIG. 16.

Example 2.7

Microwave Extraction of Secondary Oil from Sitka Spruce with Capture of Highly Volatile Components Extraction of the secondary oil from Sitka Spruce was carried out as detailed in example 6. FTIR analysis of different oil extract fractions can be seen in FIG. 16.

Example 2.8

Microwave Extraction of Oil from cellulose with Capture of Highly Volatile Components Extraction of the secondary oil from cellulose was carried out as detailed in example 6. FTIR analysis of different oil extract fractions can be seen in FIG. 16.

Example 2.9

Use of Microwave Radiation to Increase the Calorific Value of Cellulose

The use of microwave radiation to produce a char from cellulose was carried out using the following procedure.

The cellulose (200 mg) was weighed out into a microwave tube containing a magnetic follower, and then sealed using the microwave tube lid. The sample was then placed in a laboratory microwave. The typical parameters used in the microwave are: power 300 W; temperature: 150° C.-300° C.; stirring: ON; cooling: OFF.

The sample was then removed from the microwave and tested on a Stanton Redcroft STA 625 for any change in the calorific value. This was carried out using the following procedure.

Cellulose (~20 mg) that had been subjected to microwaves was, weighed out into a small sample container. To this sample, palladium oxide (~20 mg) was added. The mixture was then emptied into a clean mortar and pestle and ground for approximately 10 to 15 minutes until a very fine powder formed. This powder was then poured into another clean sample vessel and tested within one hour of mixing.

To an aluminium STA sample cup approximately 2.5 mg of the mixture was added, and then placed in the STA ready for testing. The conditions of analysis were 20 to 625° C. at 5° C. per minute in a flow of air (50 ml per minute). The calorific value results are shown in FIG. 17 along with those of chars produced under conventional pyrolysis conditions. The direct effect of the microwave irradiation on the cellulose in comparison to thermal activation under identical conditions is shown in FIG. 18. FIG. 19 shows the FTIR of cellulose before and after microwave irradiation. The $^{13}C$ MAS NMR of samples produced by microwave activation and conventional pyrolysis of similar calorific value are shown in FIG. 20.

Example 2.10

Use of Microwave Radiation to Increase the Calorific Value of Hemi-Cellulose (Xylan)

The use of microwave radiation to produce a char from hemi-cellulose (Xylan) was carried out using the following procedure and analysis outlined in Example 9. The calorific value results are shown in FIG. 21 along with those of chars produced under conventional pyrolysis conditions. The FTIR is shown in FIG. 19.

Example 2.11

Use of Microwave Radiation to Increase the Calorific Value of Barley Dust

The use of microwave radiation was used to increase the calorific value of barley dust was carried out and tested as detailed in example 9.

The typical parameters used in the microwave are: power 300 W; time: 1-30 minutes; stirring: ON; cooling: OFF.

The original STA profile before and after microwave processing for 30 minutes can be seen in FIGS. 23 and 24. The FTIR of the solid before and after microwave irradiation is shown in FIG. 19. Heat of oxidation values are recorded in FIG. 22.

Example 2.12

Use of Microwave Radiation to Increase the Calorific Value of Rape Meal

The microwave processing of rape meal for 30 minutes to increase the calorific value was carried out and tested as detailed in example 9. The original STA profile before and after microwave processing for 30 minutes can be seen in FIGS. 25 and 26, and heat of oxidation values recorded in FIG. 22. TGIR analysis of rape meal in low temperature (330° C.) show difference in volatile composition as can be seen in FIGS. 27 and 28.

Example 2.13

Use of Microwave Radiation to Increase the Calorific Value of *Miscanthus*

The microwave processing of *Miscanthus* to increase the calorific value was carried out and tested as detailed in example 9. Heat of oxidation values recorded in FIG. 22. FTIR analysis of the sample before and after microwave treatment can be seen in FIG. 19 to assess the change in functional groups in the solid state.

Example 2.14

Use of Microwave Radiation to Increase the Calorific Value of Willow

The microwave processing of willow to increase the calorific value was carried out and tested as detailed in example 9. Heat of oxidation values recorded in FIG. 22.

Example 2.15

Use of Graphite to Change the Relative Yields of Solid Chars and Gas Products in the Presence of Microwave Irradiation The use of microwave radiation to form a char from cellulose using a microwave absorber was carried out using the following procedure. Cellulose (0.99 g) and graphite (0.01 g) were weighed out into a sample container. This mixture was then agitated until the graphite was evenly distributed throughout the cellulose.

The cellulose/graphite mixture (200 mg) was weighed out into a microwave tube containing a magnetic follower, and then sealed using the microwave tube lid. The sample was then placed in a laboratory microwave. The typical parameters used in the microwave are: power 300 W; temperature: 270° C.; stirring: ON; cooling: OFF. The yield of char in comparison to char produced under the same conditions in the absence of graphite was seen to increase by 10% (wt/wt) as shown in FIG. 29.

Example 2.16

Use of Microwave Radiation to Increase the Calorific Value of Pine Wood with Graphite The calorific value of Pine wood was increased using the method as detailed in example 15. The STA profiles before and after microwave irradiation can be seen in FIG. 30 and FIG. 31 respectively.

Example 2.17

Use of Microwave Radiation to Increase the Calorific Value of Pelletised Cellulose The use of microwave radiation was used to increase the calorific value of cellulose using the following procedure.

Powdered cellulose fibres were pressurised to produce pellets. Pellets of known density were placed in a microwave tube containing a magnetic follower, and then sealed using the microwave tube lid. The sample was then placed in a laboratory microwave. The typical parameters used in the microwave are: power 300 W; time: 1-30 minutes; stirring: ON; cooling: OFF. Analysis was carried out as detailed in example 9. The calorific value of the resulting pellet was found to be higher than loose powdered cellulose fibres processed under the same conditions.

Example 2.18

Use of Microwave Radiation to Increase the Calorific Value of Rape meal on a 0.5 kg Scale The larger scale microwave processing of rape meal for 30 minutes up to a temperature of 250° C. was carried out by the following procedure. Rape meal (500 g) was weighed into the microwave vessel and placed in the microwave. The sample was heated under vacuum to remove the volatile components. The results for the char produced are shown in Tables 2.1 to 2.3.

Example 2.19

Energy Efficiency of Microwave Torrefaction for Production of Increased Calorific Value Chars and Oils from Cellulose The use of microwave radiation to produce a char and oil from cellulose was carried out using the following procedure and analysis outlined in Example 9. Microwave temperature was varied between 180-300° C. FIG. 32 shows the percentage energy per gram of starting material which is maintained in the resulting char. For example, after microwave torrefaction of 1 g of cellulose at 270° C. gives a char yield of 42%, with calorific value 30 kJ/g. The total energy condensed in the char is 0.42*30 kJ/g=12.6 kJ/g. The calorific value of the cellulose starting material is approximately 15 kJ/g, therefore the percentage of the energy maintained within the char is 84%. The yield of oil was 7% with a calorific value of 19 kJ/g. Therefore, the energy of the starting material distributed into the oil product is 1.3 kJ/g or 8.7%. The total energy yield from the oil and char after microwave torrefaction at 270° C. is 93% of the starting material's potential. Up to approximately 220° C. (mass loss circa 50%), 100% of the energy is maintained in the char and oil. As can be seen in FIG. 32 these results are better than those found for conventional heating processes.

The energy input required for the process is dependent on the mass of sample. FIG. 33 shows the energy input for the microwave torrefaction at 270° C. for different sample masses. The energy input decreases with mass of sample and for sample mass above 200 g the energy input was approximately 2 kJ/g.

Example 2.20

Influence of Power and Temperature on Properties of Secondary Oil from *Miscanthus*

The use of microwave radiation to produce a char and oil from cellulose was carried out using the following procedure and analysis outlined in Example 5. Maximum temperature reached was 150° C., using microwave power 300 W. The resulting oil was found to contain up to 30% water, and have a pH of 1-2. Oil prepared using microwave irradiation power of 150 W, reaching a maximum temperature of 120° C., a pH of 3-4 was measured with water content of less than 10%.

Example 3.1

Microwave Processing of Wheat Straw (Standard Sample)

100 g of the wheat straw was placed in a large-scale laboratory microwave (Milestone) as shown in FIG. 35. The sample was heated up to 170° C. with a heating rate 10 K./min. The microwave experiment was carried out at a power of 1200 W. Experimental information about the mass balance for the microwave pyrolysis process is shown at Table 3.1. Bio-oil composition based on GC-MS analysis is shown in FIG. 36 and Table 3.2.

Example 3.2

Microwave Processing of Wheat Straw in the Presence of 3% of Sulphuric Acid 100 g of wheat straw and 30 g of dilute sulphuric acid (10%) were weighed into the microwave vessel. This mixture was then agitated until the additive was evenly distributed throughout the biomass. The sample was then placed in a large-scale laboratory microwave and was heated up to 170° C. with a heating rate 10K/min. The microwave experiment was carried out at a power of 1200 W. Experimental information about the mass balance for the microwave pyrolysis process is shown in Table 3.1. Bio-oil composition based on GC-MS analysis is shown in FIG. 37 and Table 3.3.

Example 3.3

Microwave Processing of Wheat Straw at the Presence of 1% of Sulphuric Acid 100 g of wheat straw and 10 g of dilute sulphuric acid (10%) were weighed into the microwave vessel. This mixture was then agitated until the additive was evenly distributed throughout the biomass. The sample was then placed in a large-scale laboratory microwave and was heated up to 170° C. with a heating rate 10K/min. The microwave experiment was carried out at a power of 1200 W. Experimental information about the mass balance for the microwave pyrolysis process is shown in Table 3.1.

Example 3.4

Microwave Processing of Wheat Straw at the Presence of 3% of Hydrochloric Acid 3 g of HCl was adsorbed from the gas phase to 100 g of wheat straw. The sample was then placed in a large-scale laboratory microwave and was heated up to 170° C. with a heating rate 10K/min. The microwave experiment was carried out at a power of 1200 W. Experimental information about the mass balance for the microwave pyrolysis process is shown in Table 3.1. Bio-oil composition based on GC-MS analysis is shown in FIG. 38 and Table 3.4.

Example 3.5

Microwave Processing of Wheat Straw at the Presence of 3% of Hydrochloric Acid 1 g of HCl was adsorbed from gas phase to 100 g of wheat straw. The sample was then placed in a large-scale laboratory microwave and was heated up to 170° C. with a heating rate of 10K/min. The microwave experiment was carried out at a power of 1200 W. Experimental information about the mass balance for the microwave pyrolysis process is shown in Table 3.1.

Example 3.6

Microwave Processing of Wheat Straw at the Presence of 5% of Tri-n-Butylamine 100 g of wheat straw and 5 g of tri-n-butylamine were weighed into the microwave vessel. This mixture was then agitated until the additive was evenly distributed throughout the biomass. The sample was then placed in a large-scale laboratory microwave and was heated up to 170° C. with a heating rate of 10K/min. The microwave experiment was carried out at a power of 1200 W. Experimental information about the mass balance for the microwave pyrolysis process is shown in Table 3.1.4% of waxes were obtained in this experiment.

Example 3.7

Microwave Processing of Wheat Straw at the Presence of 5% of Ammonia 100 g of wheat straw and 18 g of ammonium hydroxide solution (28%) were weighed into the microwave vessel. This mixture was then agitated until the additive was evenly distributed throughout the biomass. The sample was then placed in a large-scale laboratory microwave and was heated up to 170° C. with a heating rate of 10K/min. The microwave experiment was carried out at a power of 1200 W. Experimental information about the mass balance for the microwave pyrolysis process is shown in Table 3.1. Bio-oil composition based on GC-MS analysis is shown in FIG. 39 and Table 3.5.

Example 3.8

Microwave Processing of Sawdust (Standard Sample)

100 g of sawdust was placed in a large-scale laboratory microwave (Milestone) as shown in FIG. 35. The sample was heated up to 200° C. with a heating rate of 10K/min. The microwave experiment was carried out at a power of 1200 W. Experimental information about the mass balance for the microwave pyrolysis process is shown in Table 3.1.

Example 3.9

Microwave Processing of Sawdust at the Presence of 3% of Sulphuric Acid 100 g of sawdust and 30 g of dilute sulphuric acid (10%) were weighed into the microwave vessel. This mixture was then agitated until the additive was evenly distributed throughout the biomass. The sample was then placed in a large-scale laboratory microwave and was heated up to 200° C. with a heating rate of 10K/min. The microwave experiment was carried out at a power of 1200 W. Experimental information about the mass balance for the microwave pyrolysis process is shown in Table 3.1.

Example 3.10

Microwave Processing of Lignin (Standard Sample)

100 g of lignin was placed in a large-scale laboratory microwave (Milestone) as shown in FIG. 35. The sample was heated up to 170° C. with a heating rate of 10K/min. The microwave experiment was carried out at a power of 1200 W. No change to the lignin was observed (see Table 3.1).

Example 3.11

Microwave Processing of Lignin at the Presence of 5% of Ammonia 100 g of lignin and 18 g of ammonium hydroxide solution (28%) were weighed into the microwave vessel. This mixture was then agitated until the additive was evenly distributed throughout the biomass. The sample was then placed in a large-scale laboratory microwave and was heated up to 170° C. with a heating rate of 10K/min. The microwave experiment was carried out at a power of 1200 W. Experimental information about the mass balance for the microwave pyrolysis process is shown in Table 3.1.

TABLE 3.1

Mass balance of what straw microwave pyrolysis.

| N | Biomass type | additive | Temperature range (° C.) MW processing | Temperature range (° C.) Oil release | Yield (mass %) Char | Yield (mass %) Organic oil | Yield (mass %) Water | Yield (mass %) Gas |
|---|---|---|---|---|---|---|---|---|
| 1 | Wheat straw | Original | 20-170° C. | 90-120° C. | 29 | 21.1 | 36.4 | 13.5 |
| 2 | | $H_2SO_4$ (3%) | 20-170° C. | 82-110° C. | 44.4 | 7.3 | 32.9 | 15.4 |
| 3 | | $H_2SO_4$ (1%) | 20-170° C. | 85-115° C. | 41.0 | 10.8 | 33.1 | 15.1 |
| 4 | | HCl (3%) | 20-170° C. | 70-90° C. | 31.8 | 22.1 | 27.1 | 19 |
| 5 | | HCl (1%) | 20-170° C. | 75-110° C. | 30.3 | 21.2 | 31.8 | 16.7 |
| 6 | | Tri-n-Butylamine | 20-170° C. | 80-110° C. | 39.9 | 20.2 | 26.2 | 13.7 |
| 7 | | $NH_3$ (5%) | 20-170° C. | 70-100° C. | 40.7 | 17.0 | 22.3 | 20 |
| 8 | Sawdust | Original | 100-200° C. | 150-180° C. | 32.7 | 26.1 | 27.7 | 13.5 |
| 9 | | $H_2SO_4$ (3%) | 20-200° C. | 70-110° C. | 42.5 | 5.0 | 18.4 | 34.1 |
| 10 | Lignin | Original | 30-170 | — | — | — | — | — |
| 11 | | $NH_3$ (5%) | 30-170 | 95-152 | 32.5 | 8.6 | 45.3 | 13.6 |

TABLE 3.2

Chemical composition of wheat straw microwaved oil.

| No | Compound | Area Percentage | RT |
|---|---|---|---|
| 1 | Acetic Acid | 0.84 | 7.194 |
| 2 | Furfural | 0.50 | 14.194 |
| 3 | 2-Furanmethanol | 0.57 | 16.057 |
| 4 | 1,2-Cyclopentanedione, 3-methyl- | 1.64 | 22.769 |
| 5 | Phenol | 2.00 | 24.154 |
| 6 | Phenol, 2-methoxy- | 2.73 | 24.703 |
| 7 | Phenol, 2-methyl- | 1.16 | 26.002 |
| 8 | Phenol, 3-methyl- | 1.23 | 27.370 |
| 9 | Phenol, 4-methyl- | 1.50 | 27.455 |
| 10 | Phenol, 2-methoxy-4-methyl- | 1.38 | 28.657 |
| 11 | | 4.55 | 28.983 |
| 12 | Phenol, 4-ethyl-2-methoxy- | 1.57 | 31.701 |
| 13 | 1,4: 3,6-Dianhydro-.alpha.-d-glucopyranose | 1.27 | 32.943 |
| 14 | Benzofuran, 2,3-dihydro- | 10.66 | 33.715 |
| 15 | Phenol, 2,6-dimethoxy- | 4.54 | 35.586 |
| 16 | Phenol, 2-methoxy-4-(1-propenyl)- | 2.84 | 38.196 |
| 17 | Vanillin | 1.13 | 38.980 |
| 18 | Hydroquinone | 1.44 | 39.185 |
| 19 | Ethanone, 1-(4-hydroxy-3-methoxyphenyl)- | 0.92 | 41.566 |
| 20 | 4-Methyl-2,5-dimethoxybenzaldehyde | 2.45 | 42.779 |
| 21 | Homovanillyl alcohol | 1.62 | 43.174 |
| 22 | L-glucosan | 27.87 | 46.309 |
| 23 | Phenol, 2,6-dimethoxy-4-(2-propenyl)- | 3.71 | 46.636 |

TABLE 3.2-continued

Chemical composition of wheat straw microwaved oil.

| No | Compound | Area Percentage | RT |
|---|---|---|---|
| 24 | Ethanone, 1-(4-hydroxy-3,5-dimethoxyphenyl)- | 1.07 | 49.456 |
| 25 | Desaspidinol | 1.30 | 50.641 |
| 26 | n-Hexadecanoic acid | 0.75 | 51.871 |

TABLE 3.3

Chemical composition of wheat straw microwaved oil prepared in the presence of $H_2SO_4$

| No | Compound | Area Percentage | RT |
|---|---|---|---|
| 1 | Acetic Acid | <0.5 | 7.325 |
| 2 | Furfural | <0.5 | 14.220 |
| 3 | 1,2-Cyclopentanedione, 3-methyl- | 0.59 | 22.769 |
| 4 | Phenol | 1.99 | 24.159 |
| 5 | Phenol, 2-methoxy- | 2.25 | 24.709 |
| 6 | Phenol, 2-methyl- | 1.07 | 26.008 |
| 7 | Phenol, 4-methyl- | 1.77 | 27.415 |
| 8 | Phenol, 3-methyl- | 0.99 | 27.495 |
| 9 | L-glucosenone | 23.63 | 28.640 |
| 10 | Phenol, 2-methoxy-4-methyl- | 1.91 | 28.680 |
| 11 | Phenol, 4-ethyl- | 0.67 | 30.597 |
| 12 | Phenol, 4-ethyl-2-methoxy- | 0.55 | 31.712 |
| 13 | 1,4: 3,6-Dianhydro-alpha-d-glucopyranose | 6.69 | 33.046 |
| 14 | 2-Methoxy-4-vinylphenol/Benzofuran, 2,3-dihydro- | 1.06 | 33.715 |
| 15 | Phenol, 2,6-dimethoxy- | 0.54 | 35.575 |
| 16 | Hydroquinone | 0.72 | 39.197 |
| 17 | Homovanillyl alcohol | 0.64 | 43.174 |
| 18 | Ethanone, 1-(4-hydroxy-3-methoxyphenyl)- | 1.61 | 44.781 |
| 19 | L-glucosan | 20.64 | 46.355 |
| 20 | Ethanone, 1-(4-hydroxy-3,5-dimethoxyphenyl)- | 1.22 | 49.468 |
| 21 | Desaspidinol | 2.21 | 50.664 |
| 22 | Aspidinol | 2.79 | 51.682 |
| 23 | n-Hexadecanoic acid | 1.19 | 51.900 |

TABLE 3.4

Chemical composition of wheat straw microwaved oil prepared in the presence of HCl.

| No | Compound | Area Percentage | RT |
|---|---|---|---|
| 1 | Acetic Acid | <0.5 | 7.222 |
| 2 | 2-Furanmethanol | <0.5 | 16.074 |
| 3 | 1,2-Cyclopentanedione | 0.83 | 18.849 |
| 4 | 2(5H)-Furanone | 0.67 | 21.264 |
| 5 | 1,2-Cyclopentanedione, 3-methyl- | 1.54 | 22.964 |
| 6 | Phenol | 1.61 | 24.205 |
| 7 | Phenol, 2-methoxy- | 2.57 | 24.789 |
| 8 | Phenol, 2-methyl- | 0.67 | 26.031 |
| 9 | Maltol | 0.98 | 26.591 |
| 10 | Phenol, 3-methyl- | 1.44 | 27.427 |
| 11 | Phenol, 4-methyl- | 0.72 | 27.507 |
| 12 | L-glucosenone | 1.51 | 28.588 |
| 13 | Phenol, 2-methoxy-4-methyl- | 1.84 | 28.720 |
| 14 | Phenol, 4-ethyl- | 1.26 | 30.660 |
| 15 | Phenol, 4-ethyl-2-methoxy- | 1.41 | 31.758 |
| 16 | 1,4: 3,6-Dianhydro-alpha-d-glucopyranose | 3.11 | 33.320 |
| 17 | 2-Methoxy-4-vinylphenol/Benzofuran, 2,3-dihydro- | 2.80 | 33.812 |
| 18 | Phenol, 2,6-dimethoxy- | 4.30 | 35.718 |
| 19 | Phenol, 2-methoxy-4-(1-propenyl)- | 0.83 | 38.264 |
| 20 | 3-Hydroxy-4-methoxybenzoic acid | 1.96 | 38.722 |
| 21 | Hydroquinone | 1.26 | 39.363 |

TABLE 3.4-continued

Chemical composition of wheat straw microwaved oil prepared in the presence of HCl.

| No | Compound | Area Percentage | RT |
|---|---|---|---|
| 22 | Ethanone, 1-(2,6-dihydroxy-4-methoxyphenyl)- | 0.90 | 41.039 |
| 23 | Ethanone, 1-(4-hydroxy-3-methoxyphenyl)- | 0.93 | 41.680 |
| 24 | Homovanillyl alcohol | 2.33 | 43.328 |
| 25 | Levoglucosan | 35.46 | 47.665 |
| 26 | Ethanone, 1-(4-hydroxy-3,5 dimethoxyphenyl)- | 0.93 | 49.605 |
| 27 | Desaspidinol | 2.05 | 50.801 |
| 28 | n-Hexadecanoic acid | 0.93 | 52.025 |

TABLE 3.5

Chemical composition of wheat straw microwaved oil prepared in the presence of $NH_3$

| No | Compound | Area Percentage | RT |
|---|---|---|---|
| 1 | 2-Furanmethanol | 0.58 | 16.063 |
| 2 | 1,2-Cyclopentanedione | 0.88 | 18.821 |
| 3 | 2(5H)-Furanone | 0.61 | 21.213 |
| 4 | 1,2-Cyclopentanedione, 3-methyl- | 1.67 | 22.872 |
| 5 | Phenol | 0.54 | 24.177 |
| 6 | Phenol, 2-methoxy- | 1.69 | 24.726 |
| 7 | Phenol, 2-methoxy-4-methyl- | 1.28 | 28.668 |
| 8 | Phenol, 4-ethyl- | 0.50 | 30.614 |
| 9 | Phenol, 4-ethyl-2-methoxy- | 1.13 | 31.724 |
| 10 | 1,4: 3,6-Dianhydro-.alpha.-d-glucopyranose | 1.22 | 33.040 |
| 11 | 2-Methoxy-4-vinylphenol/Benzofuran, 2,3-dihydro- | 10.23 | 33.755 |
| 12 | Phenol, 2,6-dimethoxy- | 3.93 | 35.632 |
| 13 | Phenol, 2-methoxy-4-(1-propenyl)- | 1.49 | 38.218 |
| 14 | Hydroquinone | 1.33 | 39.237 |
| 15 | Homovanillyl alcohol | 1.00 | 43.219 |
| 16 | Levoglucosan | 46.44 | 46.922 |
| 17 | Ethanone, 1-(4-hydroxy-3,5-dimethoxyphenyl)- | 0.92 | 49.508 |
| 18 | Desaspidinol | 2.74 | 50.698 |
| 19 | n-Hexadecanoic acid | 0.48 | 51.900 |

The invention claimed is:

1. A processor for use in the microwave torrefaction of biomass material which comprises:
   (i) a material densifier to compress the biomass and preheat the biomass material;
   (ii) a microwave unit adapted to conduct microwave-assisted torrefaction of biomass material, the unit comprising a feed pipe for transfer of the biomass material comprising gas and/or liquid outlets to enable rapid removal of gas and/or liquid formed during torrefaction,
   wherein the material densifier is integral with the microwave unit for preheating the biomass material entering the microwave unit.

2. A processor according to claim 1 wherein the material densifier is arranged and configured to produce continuous rods of material.

3. A processor according to claim 1 wherein the processor further comprises a carrier tube arranged and configured for feeding densified biomass material directly into and through the microwave chamber.

4. A processor according to claim 1 wherein the microwave unit further comprises a chamber which comprises:
   a feed pipe; wherein the feed pipe is arranged and configured such that there is minimum void between the biomass material and an inner wall of the feed pipe and wherein the feed pipe is fitted with one or more gas and/or liquid outlets.

5. The processor of claim 1, wherein the preheating of the biomass material by the densifier is a result of mechanical friction and compression.

6. A processor for use in the microwave torrefaction of biomass material which comprises:
- a microwave unit adapted to conduct microwave-assisted torrefaction of biomass material, the unit comprising:
    - a feed pipe for transfer of the biomass material comprising gas and/or liquid outlets to enable rapid removal of gas and/or liquid formed during torrefaction; and
    - a material densifier integral with the microwave unit to compress the biomass and preheat the biomass material entering the microwave unit.

* * * * *

UNITED STATES PATENT AND TRADEMARK OFFICE
CERTIFICATE OF CORRECTION

PATENT NO. : 10,072,227 B2
APPLICATION NO. : 13/002424
DATED : September 11, 2018
INVENTOR(S) : Budarin et al.

It is certified that error appears in the above-identified patent and that said Letters Patent is hereby corrected as shown below:

On the Title Page

Item (75), Inventors: add "Mark Gronnow, York (GB)".

Signed and Sealed this
Twenty-seventh Day of November, 2018

Andrei Iancu
*Director of the United States Patent and Trademark Office*